US012289581B2

(12) United States Patent
Andersson et al.

(10) Patent No.: US 12,289,581 B2
(45) Date of Patent: *Apr. 29, 2025

(54) ELECTROMAGNETIC TRANSDUCER WITH SPECIFIC INTERNAL GEOMETRY

(71) Applicant: Cochlear Limited, Macquarie University (AU)

(72) Inventors: Marcus Andersson, Gothenburg (SE); Tommy Bergs, Härryda (SE); Johan Gustafsson, Gothenburg (SE); Anders Kallsvik, Gothenburg (SE)

(73) Assignee: Cochlear Limited, Macquarie University (AU)

( * ) Notice: Subject to any disclaimer, the term of this patent is extended or adjusted under 35 U.S.C. 154(b) by 994 days.

This patent is subject to a terminal disclaimer.

(21) Appl. No.: 17/335,391

(22) Filed: Jun. 1, 2021

(65) Prior Publication Data

US 2021/0360358 A1 Nov. 18, 2021

Related U.S. Application Data

(62) Division of application No. 15/657,715, filed on Jul. 24, 2017, now Pat. No. 11,026,032, which is a division of application No. 13/837,060, filed on Mar. 15, 2013, now Pat. No. 9,716,953.

(51) Int. Cl.

| | |
|---|---|
| ***H04R 25/00*** | (2006.01) |
| *H04R 9/02* | (2006.01) |
| *H04R 9/04* | (2006.01) |
| *H04R 11/02* | (2006.01) |

(52) U.S. Cl.

CPC .......... *H04R 25/606* (2013.01); *H04R 9/025* (2013.01); *H04R 9/046* (2013.01); *H04R 11/02* (2013.01); *H04R 2209/022* (2013.01)

(58) Field of Classification Search

CPC .......................... H04R 25/606; H04R 2460/13

See application file for complete search history.

(56) References Cited

U.S. PATENT DOCUMENTS

| | | | | |
|---|---|---|---|---|
| 2011/0268303 A1* | 11/2011 | Ahsani | H04R 11/02 | 381/151 |
| 2012/0237067 A1* | 9/2012 | Asnes | H04R 9/025 | 381/326 |
| 2012/0302822 A1* | 11/2012 | Van Himbeeck | H04R 1/1091 | 381/151 |

* cited by examiner

*Primary Examiner* — Thaddeus B Cox

(74) *Attorney, Agent, or Firm* — Pilloff Passino & Cosenza LLP; Martin J. Cosenza

(57) ABSTRACT

A device, including an electromagnetic transducer including a bobbin having a space therein, a connection apparatus in fixed relationship to the bobbin configured to transfer vibrational energy directly or indirectly at least one of to or from the electromagnetic transducer, and a passage from the space to the connection apparatus.

23 Claims, 20 Drawing Sheets

ELECTROMAGNETIC TRANSDUCER WITH SPECIFIC INTERNAL GEOMETRY

CROSS-REFERENCE TO RELATED APPLICATIONS

The present application is a divisional application of U.S. patent application Ser. No. 15/657,715, filed Jul. 24, 2017, which is a divisional application of U.S. patent application Ser. No. 13/837,060, filed Mar. 15, 2013 (now U.S. Pat. No. 9,716,953), naming Marcus ANDERSSON as an inventor, the content of which application is incorporated herein by reference in its entirety.

BACKGROUND

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. For example, cochlear implants use an electrode array implanted in the cochlea of a recipient to bypass the mechanisms of the ear. More specifically, an electrical stimulus is provided via the electrode array to the auditory nerve, thereby causing a hearing percept.

Conductive hearing loss occurs when the normal mechanical pathways that provide sound to hair cells in the cochlea are impeded, for example, by damage to the ossicular chain or the ear canal. Individuals suffering from conductive hearing loss may retain some form of residual hearing because the hair cells in the cochlea may remain undamaged.

Individuals suffering from conductive hearing loss typically receive an acoustic hearing aid. Hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve.

In contrast to hearing aids, which rely primarily on the principles of air conduction, certain types of hearing prostheses commonly referred to as bone conduction devices, convert a received sound into vibrations. The vibrations are transferred through the skull to the cochlea causing generation of nerve impulses, which result in the perception of the received sound. Bone conduction devices are suitable to treat a variety of types of hearing loss and may be suitable for individuals who cannot derive sufficient benefit from acoustic hearing aids, cochlear implants, etc, or for individuals who suffer from stuttering problems.

SUMMARY

In accordance with one aspect, there is a device, comprising an electromagnetic transducer including a bobbin having a space therein, a connection apparatus in fixed relationship to the bobbin configured to transfer vibrational energy directly or indirectly at least one of to or from the electromagnetic transducer, and a passage from the space to the connection apparatus.

In accordance with another aspect, there is a method, comprising transmitting a force through a space extending through an electromagnetic transducer, thereby at least one of fixing or unfixing a component to or from, respectively, the electromagnetic transducer.

In accordance with another aspect, there is a device, comprising an electromagnetic transducer in vibrational communication with a fixation component, wherein the electromagnetic transducer is locationally fixed to the fixation component via a mechanical connection extending through the electromagnetic transducer.

In accordance with another aspect, there is a method of transducing vibration, comprising transmitting vibration to or from an electromagnetic transducer subcutaneously implanted in a recipient and in vibrational communication with a single point fixation system securing the electromagnetic transducer to bone of the recipient at a single point.

In accordance with another aspect, there is a device, comprising an electromagnetic transducer including a bobbin through which a dynamic magnetic flux flows, wherein at least a portion of the bobbin forms a magnetic core having a wall thickness of about ten times or less of a depth of penetration of the dynamic magnetic flux at that location.

BRIEF DESCRIPTION OF THE DRAWINGS

Some embodiments are described below with reference to the attached drawings, in which.

DETAILED DESCRIPTION

Figure 1A:
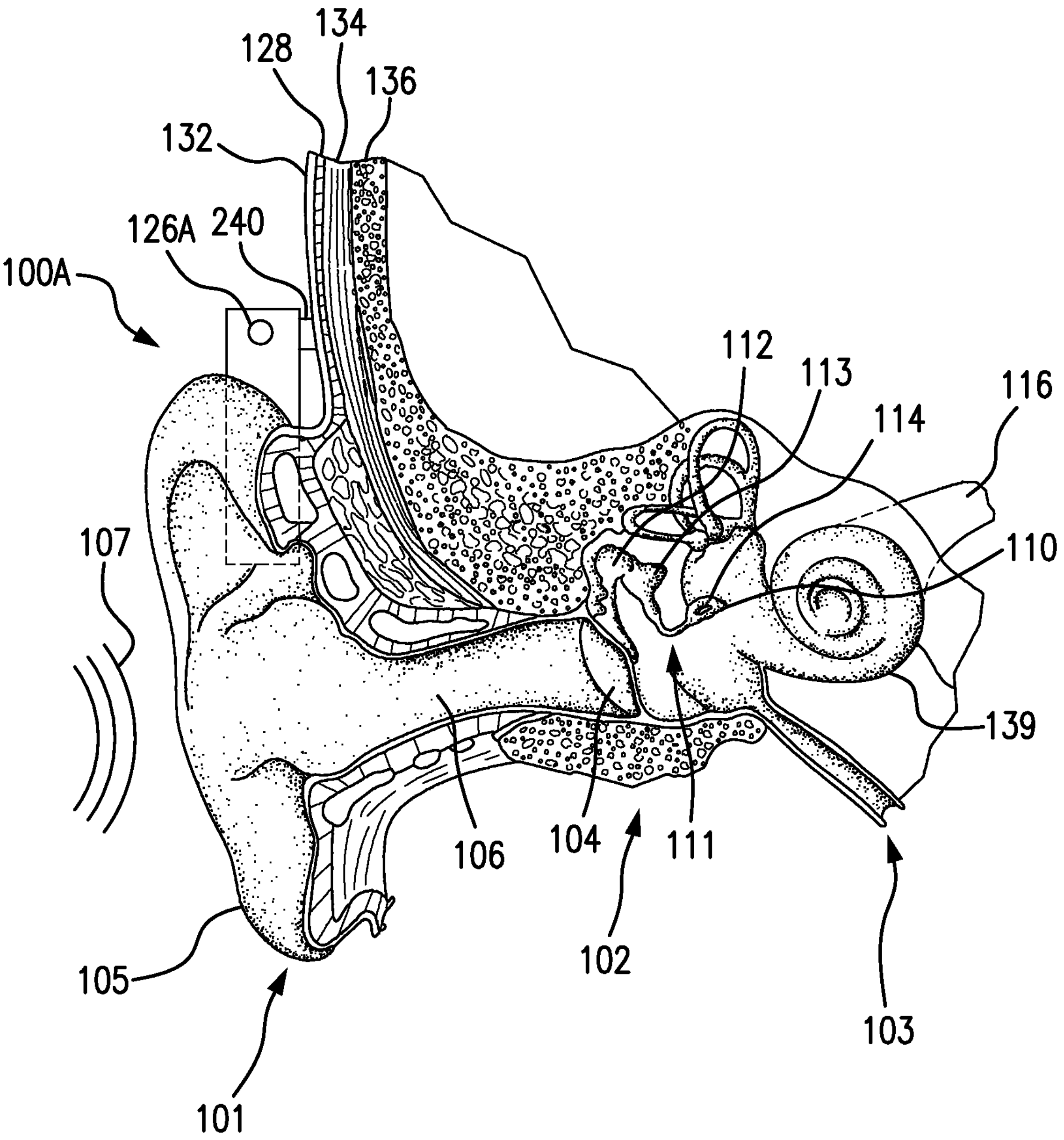
FIG. 1A is a perspective view of an exemplary bone conduction device in which at least some embodiments can be implemented.

FIG. 1A is a perspective view of a bone conduction device 100A in which embodiments may be implemented. As shown, the recipient has an outer ear 101, a middle ear 102 and an inner ear 103. Elements of outer ear 101, middle ear 102 and inner ear 103 are described below, followed by a description of bone conduction device 100.

In a fully functional human hearing anatomy, outer ear 101 comprises an auricle 105 and an ear canal 106. A sound wave or acoustic pressure 107 is collected by auricle 105 and channeled into and through ear canal 106. Disposed across the distal end of ear canal 106 is a tympanic membrane 104 which vibrates in response to acoustic wave 107. This vibration is coupled to oval window or fenestra ovalis 210 through three bones of middle ear 102, collectively referred to as the ossicles 111 and comprising the malleus 112, the incus 113 and the stapes 114. The ossicles 111 of middle ear 102 serve to filter and amplify acoustic wave 107, causing oval window 210 to vibrate. Such vibration sets up waves of fluid motion within cochlea 139. Such fluid motion, in turn, activates hair cells (not shown) that line the inside of cochlea 139. Activation of the hair cells causes appropriate nerve impulses to be transferred through the spiral ganglion cells and auditory nerve 116 to the brain (not shown), where they are perceived as sound.

FIG. 1A also illustrates the positioning of bone conduction device 100A relative to outer ear 101, middle ear 102 and inner ear 103 of a recipient of device 100. As shown, bone conduction device 100 is positioned behind outer ear 101 of the recipient and comprises a sound input element 126A to receive sound signals. Sound input element may comprise, for example, a microphone, telecoil, etc. In an exemplary embodiment, sound input element 126A may be located, for example, on or in bone conduction device 100A, or on a cable extending from bone conduction device 100A.

In an exemplary embodiment, bone conduction device 100A comprises an operationally removable component and a bone conduction implant. The operationally removable component is operationally releasably coupled to the bone conduction implant. By operationally releasably coupled, it is meant that it is releasable in such a manner that the recipient can relatively easily attach and remove the operationally removable component during normal use of the bone conduction device 100A. Such releasable coupling is accomplished via a coupling assembly of the operationally removable component and a corresponding mating apparatus of the bone conduction implant, as will be detailed below. This as contrasted with how the bone conduction implant is attached to the skull, as will also be detailed below. The operationally removable component includes a sound processor (not shown), a vibrating electromagnetic actuator and/or a vibrating piezoelectric actuator and/or other type of actuator (not shown—which are sometimes referred to herein as a species of the genus vibrator) and/or various other operational components, such as sound input device 126A. In this regard, the operationally removable component is sometimes referred to herein as a vibrator unit. More particularly, sound input device 126A (e.g., a microphone) converts received sound signals into electrical signals. These electrical signals are processed by the sound processor. The sound processor generates control signals which cause the actuator to vibrate. In other words, the actuator converts the electrical signals into mechanical motion to impart vibrations to the recipient's skull.

As illustrated, the operationally removable component of the bone conduction device 100A further includes a coupling assembly 240 configured to operationally removably attach the operationally removable component to a bone conduction implant (also referred to as an anchor system and/or a fixation system) which is implanted in the recipient. In the embodiment of FIG. 1, coupling assembly 240 is coupled to the bone conduction implant (not shown) implanted in the recipient in a manner that is further detailed below with respect to exemplary embodiments of the bone conduction implant. Briefly, an exemplary bone conduction implant may include a percutaneous abutment attached to a bone fixture via a screw, the bone fixture being fixed to the recipient's skull bone 136. The abutment extends from the bone fixture which is screwed into bone 136, through muscle 134, fat 128 and skin 232 so that the coupling assembly may be attached thereto. Such a percutaneous abutment provides an attachment location for the coupling assembly that facilitates efficient transmission of mechanical force.

It is noted that while many of the details of the embodiments presented herein are described with respect to a percutaneous bone conduction device, some or all of the teachings disclosed herein may be utilized in transcutaneous bone conduction devices and/or other devices that utilize a vibrating electromagnetic actuator. For example, embodiments include active transcutaneous bone conduction systems utilizing the electromagnetic actuators disclosed herein and variations thereof where at least one active component (e.g. the electromagnetic actuator) is implanted beneath the skin. Embodiments also include passive transcutaneous bone conduction systems utilizing the electromagnetic actuators disclosed herein and variations thereof where no active component (e.g., the electromagnetic actuator) is implanted beneath the skin (it is instead located in an external device), and the implantable part is, for instance a magnetic pressure plate. Some embodiments of the passive transcutaneous bone conduction systems are configured for use where the vibrator (located in an external device) containing the electromagnetic actuator is held in place by pressing the vibrator against the skin of the recipient. In an exemplary embodiment, an implantable holding assembly is implanted in the recipient that is configured to press the bone conduction device against the skin of the recipient. In other embodiments, the vibrator is held against the skin via a magnetic coupling (magnetic material and/or magnets being implanted in the recipient and the vibrator having a magnet and/or magnetic material to complete the magnetic circuit, thereby coupling the vibrator to the recipient).

Figure 1B:
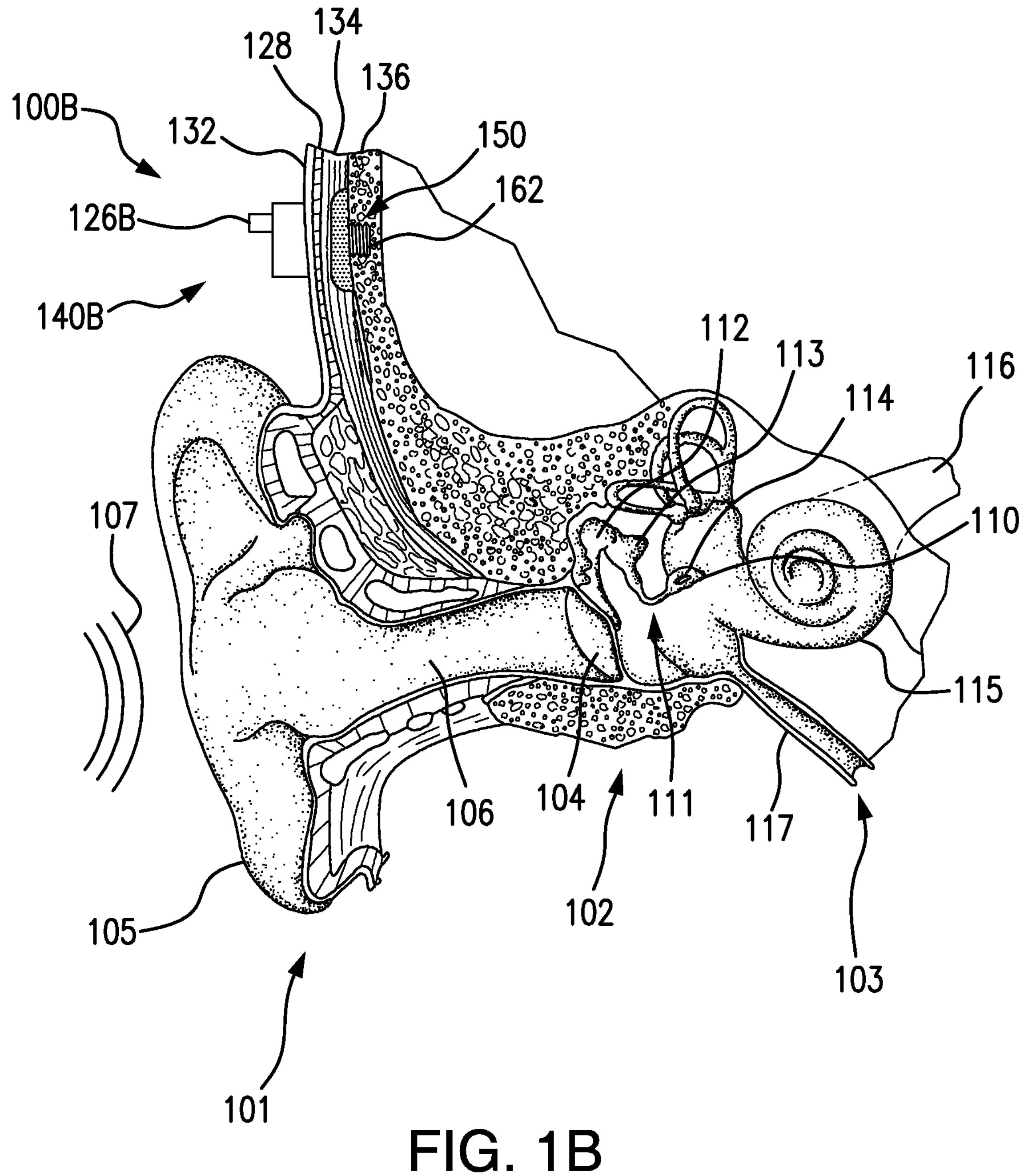
FIG. 1B is a perspective view of an alternate exemplary bone conduction device in which at least some embodiments can be implemented.

More specifically, FIG. 1B is a perspective view of a transcutaneous bone conduction device 100B in which embodiments can be implemented.

FIG. 1A also illustrates the positioning of bone conduction device 100B relative to outer ear 101, middle ear 102 and inner ear 103 of a recipient of device 100. As shown, bone conduction device 100 is positioned behind outer ear 101 of the recipient. Bone conduction device 100B comprises an external component 140B and implantable component 150. The bone conduction device 100B includes a sound input element 126B to receive sound signals. As with sound input element 126A, sound input element 126B may comprise, for example, a microphone, telecoil, etc. In an exemplary embodiment, sound input element 126B may be located, for example, on or in bone conduction device 100B, on a cable or tube extending from bone conduction device 100B, etc. Alternatively, sound input element 126B may be subcutaneously implanted in the recipient, or positioned in the recipient's ear. Sound input element 126B may also be a component that receives an electronic signal indicative of sound, such as, for example, from an external audio device. For example, sound input element 126B may receive a sound signal in the form of an electrical signal from an MP3 player electronically connected to sound input element 126B.

Bone conduction device 100B comprises a sound processor (not shown), an actuator (also not shown) and/or various other operational components. In operation, sound input device 126B converts received sounds into electrical signals. These electrical signals are utilized by the sound processor to generate control signals that cause the actuator to vibrate. In other words, the actuator converts the electrical signals into mechanical vibrations for delivery to the recipient's skull.

In accordance with some embodiments, a fixation system 162 may be used to secure implantable component 150 to skull 136. As described below, fixation system 162 may be a bone screw fixed to skull 136, and also attached to implantable component 150.

In one arrangement of FIG. 1B, bone conduction device 100B can be a passive transcutaneous bone conduction device. That is, no active components, such as the actuator, are implanted beneath the recipient's skin 132. In such an arrangement, the active actuator is located in external component 140B, and implantable component 150 includes a magnetic plate, as will be discussed in greater detail below. The magnetic plate of the implantable component 150 vibrates in response to vibration transmitted through the skin, mechanically and/or via a magnetic field, that are generated by an external magnetic plate.

In another arrangement of FIG. 1B, bone conduction device 100B can be an active transcutaneous bone conduction device where at least one active component, such as the actuator, is implanted beneath the recipient's skin 132 and is thus part of the implantable component 150. As described below, in such an arrangement, external component 140B may comprise a sound processor and transmitter, while implantable component 150 may comprise a signal receiver and/or various other electronic circuits/devices.

Figure 2:
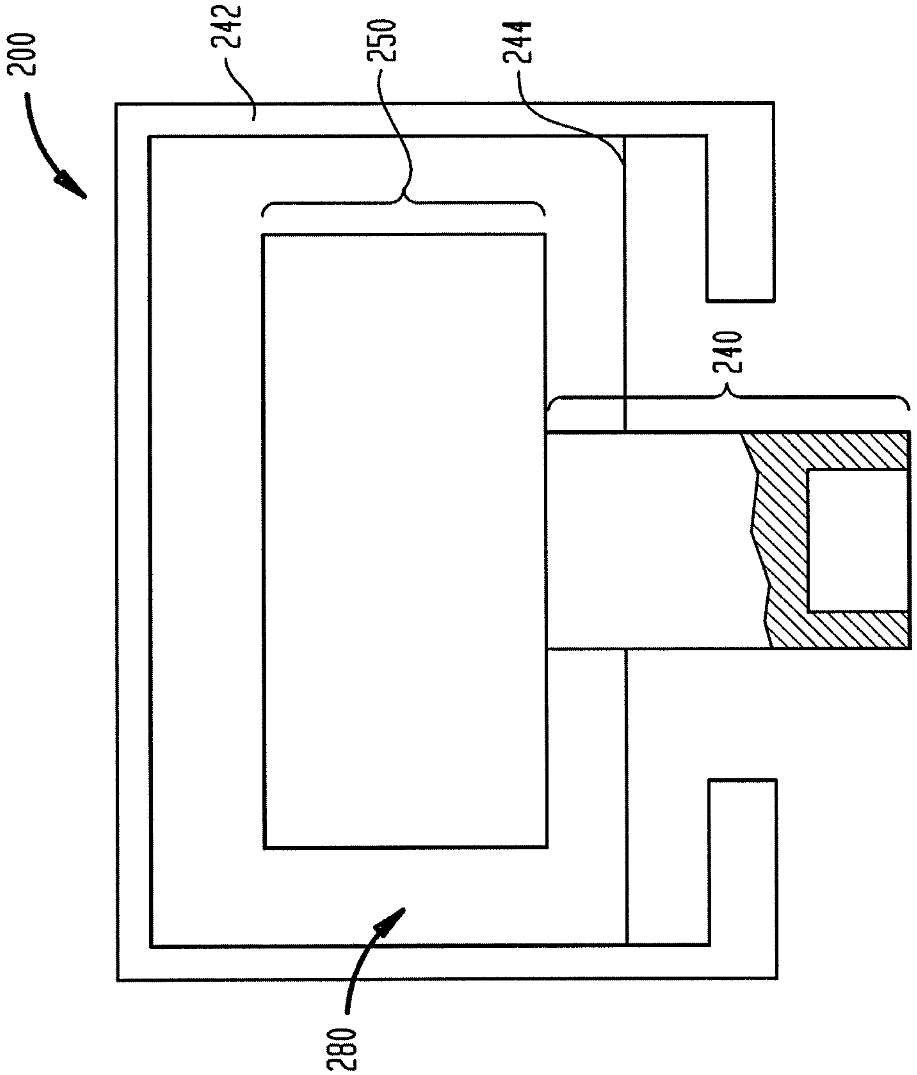
FIG. 2 is a schematic diagram conceptually illustrating a removable component of a percutaneous bone conduction device in accordance with at least some exemplary embodiments.

FIG. 2 is an embodiment of a bone conduction device 200 in accordance with an embodiment corresponding to that of FIG. 1A, illustrating use of a percutaneous bone conduction device. Bone conduction device 200, corresponding to, for example, element 100A of FIG. 1A, includes a housing 242, a vibrating electromagnetic actuator 250, a coupling assembly 240 that extends from housing 242 and is mechanically linked to vibrating electromagnetic actuator 250. Collectively, vibrating electromagnetic actuator 250 and coupling assembly 240 form a vibrating electromagnetic actuator-coupling assembly 280. Vibrating electromagnetic actuator-coupling assembly 280 is suspended in housing 242 by spring 244. In an exemplary embodiment, spring 244 is connected to coupling assembly 240, and vibrating electromagnetic actuator 250 is supported by coupling assembly 240. It is noted that while embodiments are detailed herein that utilize a spring, alternate embodiments can utilize other types of resilient elements. Accordingly, unless otherwise noted, disclosure of a spring herein also includes disclosure of any other type of resilient element that can be utilized to practice the respective embodiment and/or variations thereof.

Figure 3:
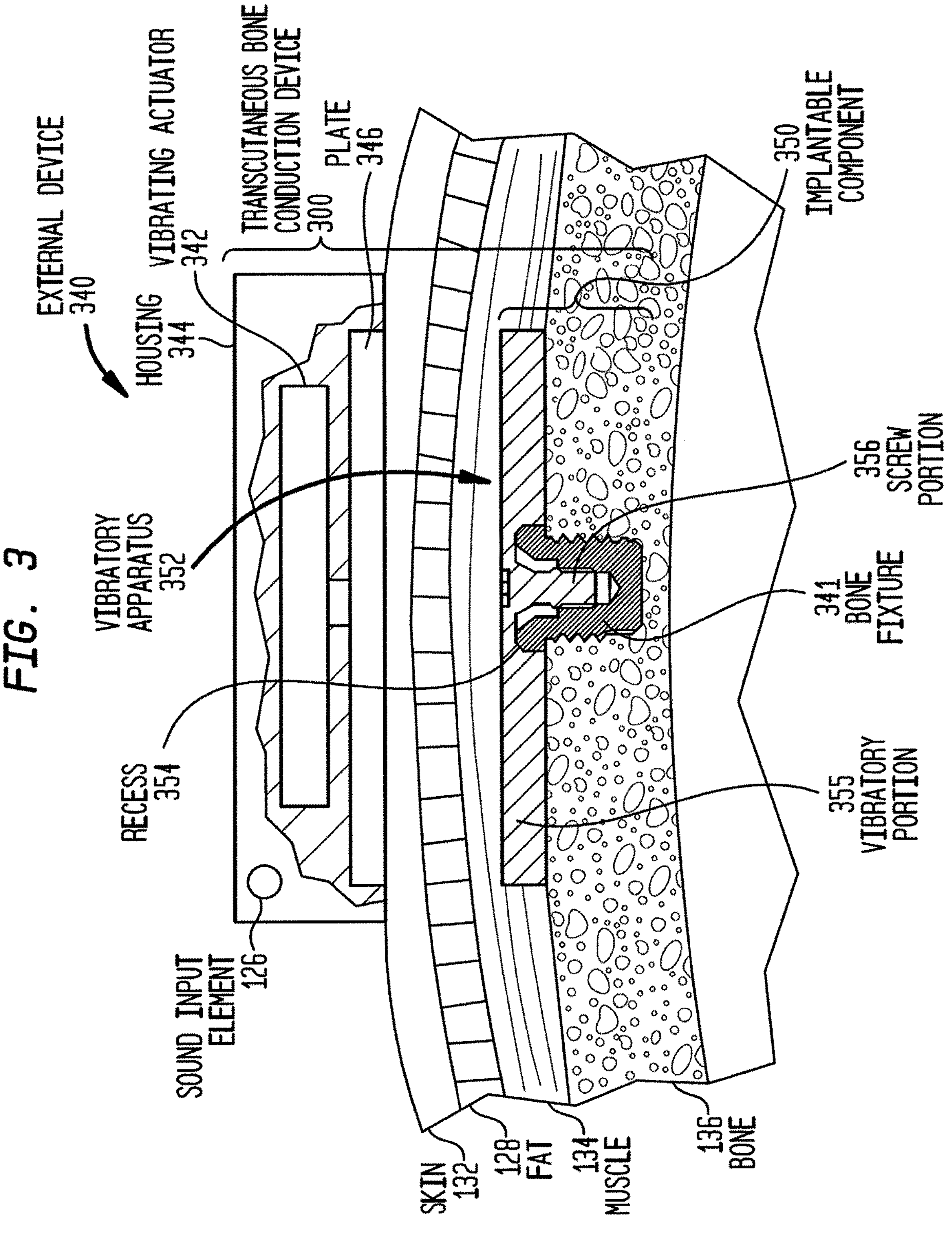
FIG. 3 is a schematic diagram conceptually illustrating a passive transcutaneous bone conduction device in accordance with at least some exemplary embodiments.

FIG. 3 depicts an exemplary embodiment of a transcutaneous bone conduction device 300 according to an embodiment that includes an external device 340 (corresponding to, for example, element 140B of FIG. 1B) and an implantable component 350 (corresponding to, for example, element 150 of FIG. 1B). The transcutaneous bone conduction device 300 of FIG. 3 is a passive transcutaneous bone conduction device in that a vibrating electromagnetic actuator 342 is located in the external device 340. Vibrating electromagnetic actuator 342 is located in housing 344 of the external component, and is coupled to plate 346. Plate 346 may be in the form of a permanent magnet and/or in another form that generates and/or is reactive to a magnetic field, or otherwise permits the establishment of magnetic attraction between the external device 340 and the implantable component 350 sufficient to hold the external device 340 against the skin of the recipient.

In an exemplary embodiment, the vibrating electromagnetic actuator 342 is a device that converts electrical signals into vibration. In operation, sound input element 126 converts sound into electrical signals. Specifically, the transcutaneous bone conduction device 300 provides these electrical signals to vibrating electromagnetic actuator 342, or to a sound processor (not shown) that processes the electrical signals, and then provides those processed signals to vibrating electromagnetic actuator 342. The vibrating electromagnetic actuator 342 converts the electrical signals (processed or unprocessed) into vibrations. Because vibrating electromagnetic actuator 342 is mechanically coupled to plate 346, the vibrations are transferred from the vibrating electromagnetic actuator 342 to plate 346. Implanted plate assembly 352 is part of the implantable component 350, and is made of a ferromagnetic material that may be in the form of a permanent magnet, that generates and/or is reactive to a magnetic field, or otherwise permits the establishment of a magnetic attraction between the external device 340 and the implantable component 350 sufficient to hold the external device 340 against the skin of the recipient. Accordingly, vibrations produced by the vibrating electromagnetic actuator 342 of the external device 340 are transferred from plate 346 across the skin to plate 355 of plate assembly 352. This can be accomplished as a result of mechanical conduction of the vibrations through the skin, resulting from the external device 340 being in direct contact with the skin and/or from the magnetic field between the two plates. These vibrations are transferred without penetrating the skin with a solid object such as an abutment as detailed herein with respect to a percutaneous bone conduction device.

As may be seen, the implanted plate assembly 352 is substantially rigidly attached to a bone fixture 341 in this embodiment. Plate screw 356 is used to secure plate assembly 352 to bone fixture 341. The portions of plate screw 356 that interface with the bone fixture 341 substantially correspond to an abutment screw discussed in some additional detail below, thus permitting plate screw 356 to readily fit into an existing bone fixture used in a percutaneous bone conduction device. In an exemplary embodiment, plate screw 356 is configured so that the same tools and procedures that are used to install and/or remove an abutment screw (described below) from bone fixture 341 can be used to install and/or remove plate screw 356 from the bone fixture 341 (and thus the plate assembly 352).

Figure 4:
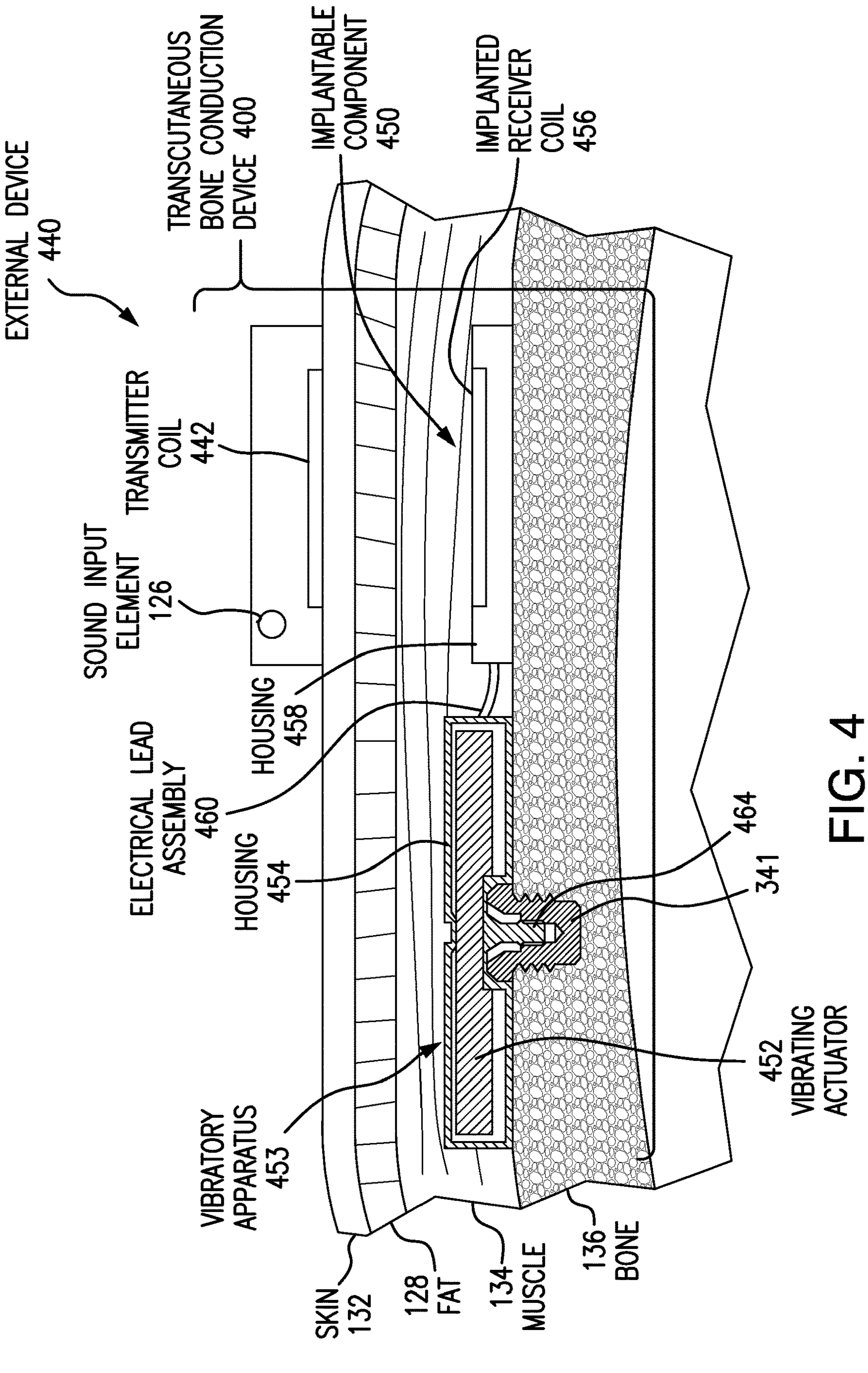
FIG. 4 is a schematic diagram conceptually illustrating an active transcutaneous bone conduction device in accordance with at least some exemplary embodiments.

FIG. 4 depicts an exemplary embodiment of a transcutaneous bone conduction device 400 according to another embodiment that includes an external device 440 (corresponding to, for example, element 140B of FIG. 1B) and an implantable component 450 (corresponding to, for example, element 150 of FIG. 1B). The transcutaneous bone conduction device 400 of FIG. 4 is an active transcutaneous bone conduction device in that the vibrating electromagnetic actuator 452 is located in the implantable component 450. Specifically, a vibratory element in the form of vibrating electromagnetic actuator 452 is located in housing 454 of the implantable component 450. In an exemplary embodiment, much like the vibrating electromagnetic actuator 342 described above with respect to transcutaneous bone conduction device 300, the vibrating electromagnetic actuator 452 is a device that converts electrical signals into vibration.

External component 440 includes a sound input element 126 that converts sound into electrical signals. Specifically, the transcutaneous bone conduction device 400 provides these electrical signals to vibrating electromagnetic actuator 452, or to a sound processor (not shown) that processes the electrical signals, and then provides those processed signals to the implantable component 450 through the skin of the recipient via a magnetic inductance link. In this regard, a transmitter coil 442 of the external component 440 transmits these signals to implanted receiver coil 456 located in housing 458 of the implantable component 450. Components (not shown) in the housing 458, such as, for example, a signal generator or an implanted sound processor, then generate electrical signals to be delivered to vibrating electromagnetic actuator 452 via electrical lead assembly 460. The vibrating electromagnetic actuator 452 converts the electrical signals into vibrations.

The vibrating electromagnetic actuator 452 is mechanically coupled to the housing 454. Housing 454 and vibrating electromagnetic actuator 452 collectively form a vibratory apparatus 453. The housing 454 is substantially rigidly attached to bone fixture 341.

It is noted that with respect to the embodiments of FIGS. 2-4, each embodiment has a fixation component. With respect to FIG. 2, the fixation component is a recipient coupling in the form of coupling assembly 240. With respect to FIG. 3, the fixation component is a component (details not specifically shown) of the pressure plate 346. With respect to FIG. 4, the fixation component includes the bone fixture 341.

As will be further detailed below, various teachings detailed herein and/or variations thereof can be applicable to the various embodiments of FIGS. 2-4 and/or variations thereof. In an exemplary embodiment, the various teachings detailed herein and/or variations thereof can be applied to the various embodiments of FIGS. 2-4 to obtain a hearing prosthesis where a vibrating electromagnetic actuator is in vibrational communication with a fixation component such that vibrations generated by the vibrating electromagnetic actuator in response to a sound captured by sound capture devices of the various embodiments are ultimately transmitted to bone of a recipient in a manner that at least effectively evokes hearing percept. By "effectively evokes a hearing percept," it is meant that the vibrations are such that a typical human between 18 years old and 40 years old having a fully functioning cochlea receiving such vibrations, where the vibrations communicate speech, would be able to understand the speech communicated by those vibrations in a manner sufficient to carry on a conversation provided that those adult humans are fluent in the language forming the basis of the speech. That said, it is noted that embodiments can also effectively evoke a hearing percept in humans younger than 18 years old and older than 40 years old and/or with humans without a fully functioning cochlea and/or in humans that are not completely fluent in the language forming the basis of the speech. In other words, the aforementioned population of 18 to 40 year olds is provided by way of example and not by way of limitation.

Some exemplary features of the vibrating electromagnetic actuator usable in some embodiments of the bone conduction devices detailed herein and/or variations thereof will now be described in terms of a vibrating electromagnetic actuator used in the context of the percutaneous bone conduction device of FIG. 1A. It is noted that any and/or all of these features and/or variations thereof may be utilized in transcutaneous bone conduction devices and/or other types of prostheses and/or medical devices and/or other devices. It is further noted that while embodiments detailed herein are often referred to in terms of the electromagnetic transducer being an actuator, is to be understood that any of these teachings, unless otherwise specifically noted, are equally applicable to electromagnetic transducers that receive vibration and output a signal resulting from the received vibrations.

Figure 5:
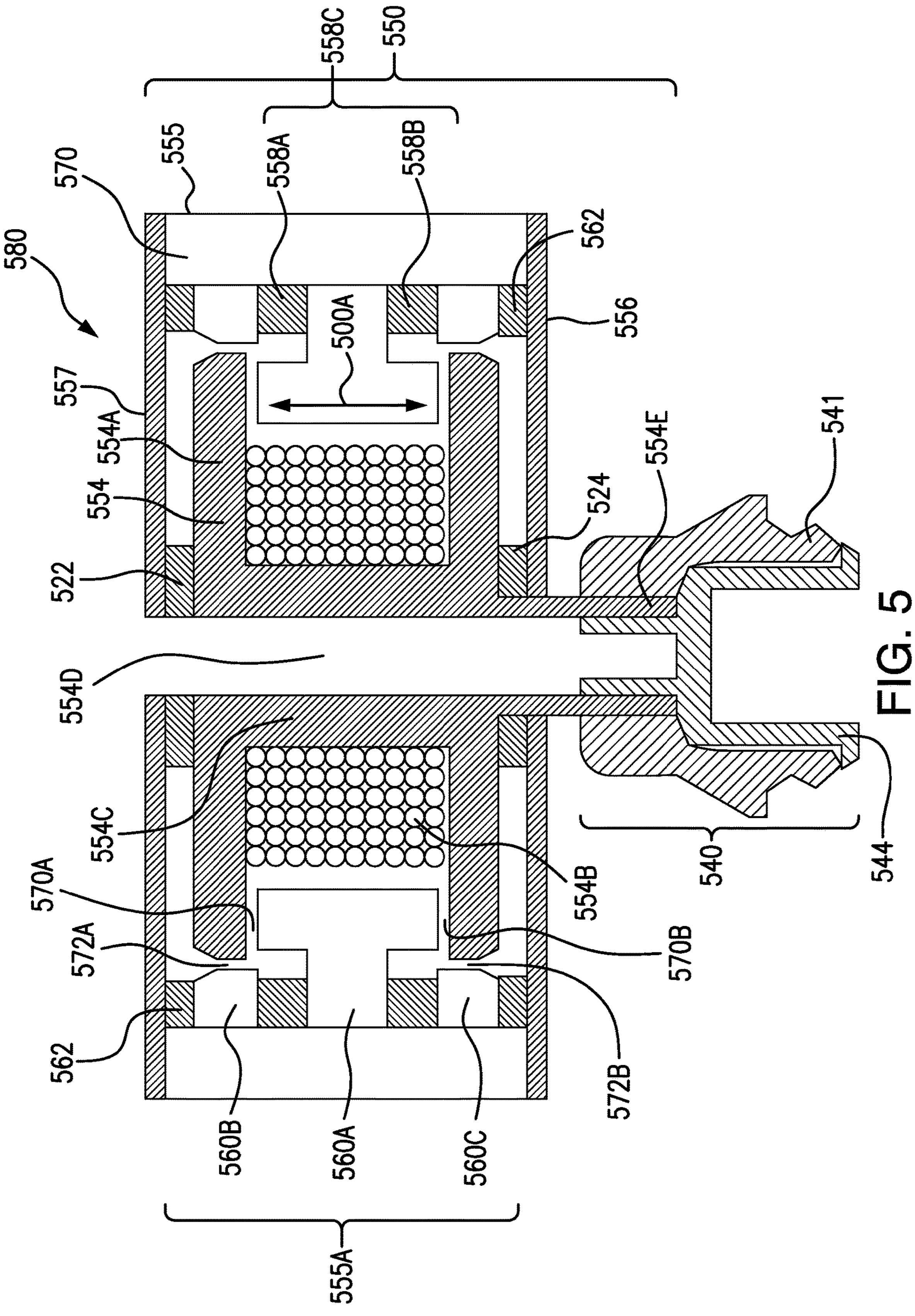
FIG. 5 is a cross-sectional view of an example of a vibrating electromagnetic actuator-coupling assembly of the bone conduction device of FIG. 2.

FIG. 5 is a cross-sectional view of a vibrating electromagnetic actuator-coupling assembly 580, which can correspond to vibrating electromagnetic actuator-coupling assembly 280 detailed above. The vibrating electromagnetic actuator-coupling assembly 580 includes a vibrating electromagnetic transducer 550 in the form of an actuator and a coupling assembly 540. Coupling assembly 540 includes a coupling 541, which is mounted on bobbin extension 554E (discussed in greater detail below), and sleeve 544 (a protective sleeve). As can be seen from FIG. 5, in this exemplary embodiment, the coupling assembly 540 is not a monolithic component. For example, sleeve 544 is a separate component from coupling 541.

As illustrated in FIG. 5, vibrating electromagnetic actuator 550 includes a bobbin assembly 554 and a counterweight assembly 555. As illustrated, bobbin assembly 554 includes a bobbin 554A and a coil 554B that is wrapped around a core 554C of bobbin 554A. In the illustrated embodiment, bobbin assembly 554 is radially symmetrical. It is noted that unless otherwise specified, the electromagnetic transducers detailed herein are radially symmetrical.

Counterweight assembly 555 includes springs 556 and 557, permanent magnets 558A and 558B, yokes 560A, 560B and 560C, spacers 562, and counterweight mass 570. Spacers 562 provide a connective support between spring 556 and the other elements of counterweight assembly 555 just detailed, although it is noted that in some embodiments, these spacers are not present, and the spring is connected only to the counterweight mass 570, while in other embodiments, the spring is only connected to the spacers. Springs 556 and 557 connect bobbin assembly 554 via spacers 522 and 524 to the rest of counterweight assembly 555, and permit counterweight assembly 555 to move relative to bobbin assembly 554 upon interaction of a dynamic magnetic flux, produced by coil 554B. The static magnetic flux is produced by permanent magnets 558A and 558B of counterweight assembly 555. In this regard, counterweight assembly 555 is a static magnetic field generator, where the permanent magnets 558A and 558B are arranged such that their respective south poles face each other and their respective north poles face away from each other. It is noted that in other embodiments, the respective south poles may face away from each other and the respective north poles may face each other.

Coil 554B, in particular, may be energized with an alternating current to create the dynamic magnetic flux about coil 554B. In an exemplary embodiment, bobbin 554A is made of a soft iron. The iron of bobbin 554A is conducive to the establishment of a magnetic conduction path for the dynamic magnetic flux. In an exemplary embodiment, the yokes of the counterweight assembly 555 are made of soft iron also conducive to the establishment of a magnetic conduction path for the static magnetic flux.

The soft iron of the bobbin and yokes may be of a type that increases the magnetic coupling of the respective magnetic fields, thereby providing a magnetic conduction path for the respective magnetic fields. As will be further detailed below, in other embodiments, other types of material, at least for the bobbin, can be utilized in at least some embodiments.

As may be seen, vibrating electromagnetic actuator 550 includes two axial air gaps 570A and 570B that are located between bobbin assembly 554 and counterweight assembly 555. With respect to a radially symmetrical bobbin assembly 554 and counterweight assembly 555, such as that detailed in FIG. 5, air gaps 570A and 570B extend in the direction of the primary relative movement between bobbin assembly 554 and counterweight assembly 555, indicated by arrow 500A (the primary relative movement is discussed in greater detail below).

Further as may be seen in FIG. 5, the vibrating electromagnetic actuator 550 includes two radial air gaps 572A and 572B that are located between bobbin assembly 554 and counterweight assembly 555. With respect to a radially symmetrical bobbin assembly 554 and counterweight assembly 555, the air gap extends about the direction of relative movement between bobbin assembly 554 and counterweight assembly 555. As may be seen in FIG. 5, the permanent magnets 558A and 558B are arranged such that their respective south poles face each other and their respective north poles face away from each other.

In the electromagnetic actuator of FIG. 5, the radial air gaps 572A and 572B close static magnetic flux between the bobbin 554A and the yokes 560B and 560C, respectively. Further, axial air gaps 570A and 570B close the static and dynamic magnetic flux between the bobbin 554A and the yoke 560A. Accordingly, in the radially symmetrical device of FIG. 5, there are a total of four (4) air gaps. It is noted that the phrase "air gap" refers to a gap between the component that produces a static magnetic field and a component that produces a dynamic magnetic field where there is a relatively high reluctance but magnetic flux still flows through the gap. The air gap closes the magnetic field. In an exemplary embodiment, the air gaps are gaps in which little to no material having substantial magnetic aspects is located in the air gap. Accordingly, an air gap is not limited to a gap that is filled by air. In this vein, additional gaps that do not close a magnetic field may be present, but they are not air gaps.

It is noted that the electromagnetic actuator of FIG. 5 is a balanced actuator. In alternate configuration a balanced actuator can be achieved by adding additional axial air gaps above and below the outside of bobbin 554B (and in some variations thereof, the radial air gaps are not present due to the addition of the additional axial air gaps). In such an alternate configuration, the yokes 560B and 560C are reconfigured to extend up and over the outside of bobbin 554B (the geometry of the permanent magnets 558A and 558B and/or the yoke 560A might also be reconfigured to achieve utility of the actuator).

Some embodiments can use fewer air gaps than the configuration of FIG. 5. Along the lines above, some embodiments utilize four axial air gaps and no radial air gaps. In some embodiments, fewer air gaps can be utilized. In at least some embodiments, the teachings herein and variations thereof are applicable to any balanced electromagnetic actuator that has a bobbin through which a dynamic magnetic flux passes. It is further noted that in alternative embodiments, the teachings detailed herein and/or variations thereof can be applicable to unbalanced electromagnetic actuators, at least with respect to a bobbin thereof through which a dynamic magnetic flux passes.

As can be seen from FIG. 5, the vibrating electromagnetic actuator 550 includes a passage passing all the way therethrough. (In order to better convey the concepts of the teachings herein, the "background lines" of the cross-sectional views are not depicted in the figures. It is to be understood that in at least the case of a radially symmetric transducer according to the embodiment of FIG. 5, components such as springs 556 and 557, the bobbin 664, etc., extend about the longitudinal axis of the transducer. It was determined that depicting such background lines would distract from the concepts of the teachings herein.) More particularly, the bobbin 554A includes space therein, in the form of bore 554D that passes all the way therethough, including through bobbin extension 554E. This space constitutes a passage through the bobbin 554A. Also, spacers 522 and 524 and springs 556 and 557 have a space in the form of a bore that passes all the way therethrough. These spaces constitute a passage through the spacers and through the springs. In an exemplary embodiment, as can be seen in FIG. 5, the space extends from one side of the bobbin 554A to another side of the bobbin 554A, and a plane bifurcating the bobbin normal to a direction of extension of the space extends through no component within the space.

Still with reference to FIG. 5, it can be seen that there is a passage from the space within the bobbin 554A to the connection apparatus 540, albeit in the embodiment of FIG. 5, the space is the passage. It is noted that while the space and the passage are one and the same, in an alternate embodiment, the passage can be different from the space (such as, for example, in an embodiment where the bobbin extension 554E is a separate component from the bobbin 554A (e.g., the bobbin 554A and the bobbin extension 554E are not monolithic components), etc.).

It is noted that while the embodiment depicted in FIG. 5 includes a passage from the space within the bobbin to the connection apparatus that is not obstructed, other embodiments can include a configuration where space forming a passage is filled or otherwise contains other solid or liquid material, but there still exists a passage providing that this material is removable. Further along these lines, even if the space within the bobbin is filled with or otherwise contains other solid or liquid material, the space still exists providing that the material is removable. (By removable, it is meant that the material can be removed without altering the structure in a manner such that reversing the operation or otherwise replacing the removed material with new material will result in restoring the structure to its original form. Material that can be removed only via drilling, for example, is not removable, whereas a component that can be plastically deformed for removal, and replaced with a new component to achieve the prior form is removable.)

It is noted that a device that requires removal of the entire connection apparatus from the device, or at least from a portion of the device of which the electromagnetic transducer is apart, to pass from the space "to" the connection apparatus does not include a passage from a space within a bobbin of the transducer to "to" the connection apparatus. In this regard, it is no longer a device but instead separate parts no longer in device assembly with one another.

Still further, it is noted that a space within a space of a bobbin constitutes a space within a bobbin (e.g., with respect to some of the embodiments, below, the space within a tube passing through the space within a bobbin constitutes a space within a bobbin). Also, it is noted that in some embodiments, there is a bobbin assembly that includes a space in which a component is located that moves (or more accurately, does not move—its spatial geometry with respect to the bobbin does not change) with the bobbin when the transducer is energized (e.g., the counterweight assembly moves but the bobbin and the component therein does not, or visa-versa).

The space within the bobbin 554A constitutes, at least in part, in the embodiment depicted in FIG. 5, a hollow section within an integral bobbin component (bobbin 554A). As can be seen, it extends completely through the bobbin 554A. The coils 554B wound about the bobbin 554A, which are configured to generate dynamic magnetic flux, extend about the space within the bobbin.

Still with reference to FIG. 5, it can be seen that a connection apparatus in the form of coupling assembly 540, is in fixed relationship to the bobbin assembly 554 in general, and the bobbin 554A in particular. In the embodiment depicted in FIG. 5, the coupling assembly is configured to transfer vibrational energy from the vibrating electromagnetic actuator 550. As noted above, while embodiments detailed herein are directed towards an actuator, other embodiments are directed towards a transducer that receives vibrational energy, and transducers that vibrational energy into electrical output (e.g. the opposite of the actuator). Accordingly, exemplary embodiments include a connection apparatus in fixed relationship to the bobbin configured to transfer vibrational energy to and/or from an electromagnetic transducer. It is noted that in an exemplary embodiment, such a transducer can correspond exactly to or otherwise be similar to the embodiment of FIG. 5.

While the embodiment of FIG. 5 depicts the coupling assembly 540 directly fixed to bobbin assembly 554, in an alternate embodiment, an intervening component between the two components can be present such that the coupling assembly 540 is indirectly fixed to the bobbin assembly 554. Accordingly, while the coupling assembly 540 transfers vibrational energy directly to or from the electromagnetic transducer 550, in other embodiments, the coupling assembly 540 may indirectly transfer vibrational energy to or from the electromagnetic transducer 550. Along these lines, while the bobbin extension 554E is depicted as being a part of a monolithic bobbin 554A, as noted above, bobbin extension 554E, or at least the portion of that component to which the coupling assembly 540 is attached, can be a separate component from the electromagnetic transducer 550. Any device, system, or method that can establish a fixed relationship between the bobbin assembly and/or a component of the bobbin assembly and the coupling assembly and/or a component of the coupling assembly can be utilized in at least some embodiments.

Some exemplary utilities of a bobbin having the features detailed herein and/or variations thereof will now be described.

One exemplary utility is that, in some embodiments, the passageway from the space in the bobbin to the connection apparatus can be used to access connection components that place the electromagnetic transducer into vibrational communication with another structure (either directly or indirectly), such as bone of a recipient. In this regard, FIGS. 6, 8A, 8B and 8C depict such embodiments. Each of these embodiments will now be described.

Figure 6:
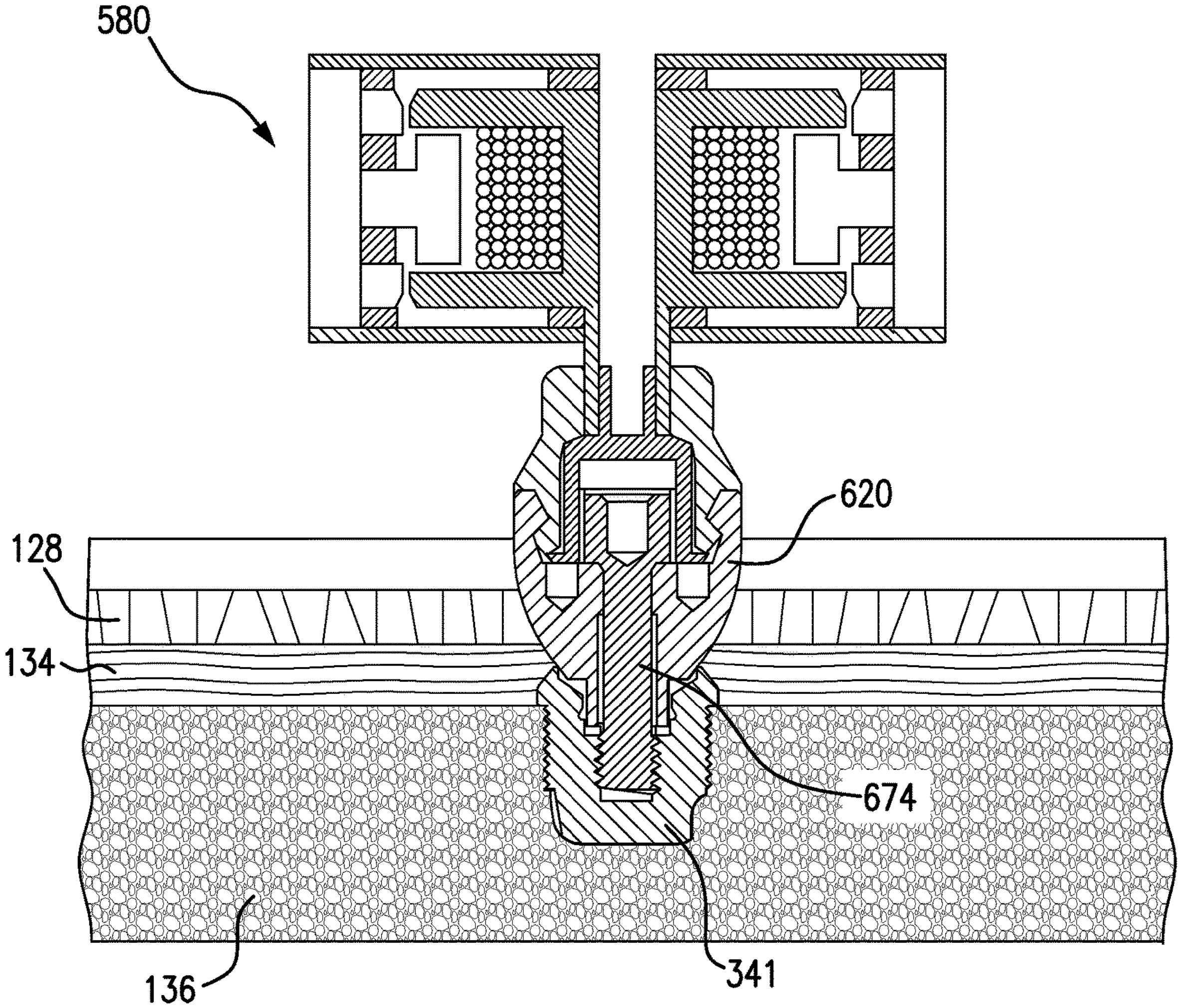
FIG. 6 is a schematic diagram illustrating connection of the vibrating electromagnetic actuator-coupling assembly of FIG. 5 to and implanted abutment.

FIG. 6 depicts use of the embodiment of FIG. 5 to provide vibrational energy into bone 136 of a recipient via vibrating electromagnetic actuator-coupling assembly 580. More particularly, FIG. 6 shows the coupling assembly 540 snap-coupled to abutment 620, which is secured to bone fixture 341 via abutment screw 674. In operation, vibrational energy generated by the vibrating electromagnetic transducer 550 travels down bobbin extension 554E into the coupling assembly 540, and then from coupling assembly 540 to the abutment 620 and then into bone fixture 341 and then into bone 136. In an exemplary embodiment, the vibrational communication effectively evokes a hearing percept. As can be seen, the passageway through the bobbin 554A extends to coupling assembly 540, and thus extends to a connection apparatus configured to transfer vibrational energy from the electromagnetic transducer 550. Accordingly, the electromagnetic transducer 550 is an electromagnetic actuator. However, as noted above, in alternate embodiments, electromagnetic transducer 550 receives vibrations from a recipient or the like. Accordingly, in such an embodiment, the passageway through the bobbin 564A extends to a connection apparatus configured to transfer vibrational energy to the electromagnetic transducer 550.

In an exemplary embodiment, the abutment is a generally concave component having a hollow portion at a top thereof into which the coupling assembly 540 fits (teeth of the coupling assembly 540 fit into the hollow portion). The hollow portion has an overhanging portion at the end of the abutment around which teeth of the coupling extend to snap-fit to the abutment. While an exemplary embodiment of the abutment entails a challis shaped outer profile, other embodiments can be substantially cylindrical or hour-glass shaped, etc.

It is noted that while the embodiment of the coupling assembly 540 detailed herein is directed to a snap-fit arrangement, in an alternate embodiment, a magnetic coupling can be used. Alternatively, a screw fitting can be used. In some embodiments, the coupling assembly 540 corresponds to a female component and the abutment corresponds to a male component, in some alternate embodiments, this is reversed. Any device, system or method that can enable coupling of the removable component to an implanted prosthesis can be utilized in at least some embodiments providing that the teachings detailed herein and/or variations thereof can be practiced.

As noted above, any vibrating electromagnetic transducer-coupling assembly 580 includes a protective sleeve 544 that is part of the coupling assembly 540. In this regard, coupling 541 is a male portion of a snap coupling that fits into the female portion of abutment 620, as can be seen in FIG. 6.

The outer circumference of coupling 541 has spaces at the bottom portion thereof (i.e. the side that faces the abutment 620) in a manner analogous to the spaces between human teeth, albeit the width of the spaces are larger in proportion to the width of the teeth as compared to that of a human. During attachment of the vibrating electromagnetic transducer-coupling assembly 580 to the abutment 620, the potential exists for misalignment between the abutment 620 and the coupling 541 such that the outer wall that establishes the female portion of the abutment 620 can enter the space between the teeth of the coupling 541 (analogous to the top of a paper cup (albeit a thin paper cup) passing into the space between two human teeth. In some embodiments, this could have a deleterious result (e.g., teeth might be broken off if the components are moved in a lateral direction during this misalignment (which is not an entirely implausible scenario, as percutaneous bone conduction devices are typically attached to a recipient behind the ear, and thus the recipient cannot see the attachment), etc.).

Sleeve 544 is a solid sleeve with a portion that juts out in the lateral direction such that it is positioned between the very bottom portion of coupling 541 and the abutment 620. The portion that juts out, because it is continuous about the radial axis (e.g., no spaces, unlike the teeth) prevents the wall forming the female portion of the abutment 620 from entering between the teeth of the coupling 541. (This is analogous to, for example, placing a soft plastic piece generally shaped in the form of a “U” against the tips of a set of human bottom or top teeth. Nothing moving in the longitudinal direction of the teeth can get into the space between the teeth because it will first hit the “U” shaped plastic.) In this regard, the vibrating electromagnetic transducer-coupling assembly 580 includes a connection apparatus that in turn includes a protective sleeve 544 configured to limit a number of interface regimes of the connection apparatus with the abutment 620. In an exemplary embodiment, this is the case at least with respect to those that would otherwise exist in the absence of the protective sleeve 544 (e.g. in the absence of the sleeve, the wall of the abutment could fit into the space between the teeth of coupling 541—with the sleeve, the wall of the abutment cannot fit into the space between the teeth of coupling 541).

Sleeve 544 is an item that can be subject to wear and/or structural fatigue and or fracture (e.g., if the sleeve 544, which can be made out of plastic, is pressed too hard against the abutment wall, which is typically made of titanium or another metal). Accordingly, in some embodiments, it is utilitarian to be able to remove the sleeve 544 from the rest of the vibrating electromagnetic transducer-coupling assembly 580 and replace the sleeve with a new sleeve (in an exemplary embodiment, this is the case without removing, for example, coupling 541). In an alternative embodiment, the sleeve 544 may not “need” to be replaced (e.g., the condition thereof is functional), but its removal is utilitarian in that it permits access to another component and/or permits another component to be removed, or otherwise more easily removed, as compared to removal of that component without removal of the sleeve. In some embodiments, it is utilitarian to be able to replace the sleeve 544 without disassembling and/or significantly disassembling the vibrating electromagnetic transducer-coupling assembly 580. For example, in an exemplary embodiment, it is utilitarian to only remove the sleeve 544 from the assembly 580. (It is noted however that in some embodiments, the assembly 580 is suspended within a housing such as by way of example in accordance with the embodiment of FIG. 2, and thus in at least some embodiments, the assembly 580 is to be removed from that housing prior to removing sleeve 544.)

Along these lines, in an exemplary embodiment, the vibrating electromagnetic transducer-coupling assembly 580 is configured such that access to the sleeve 544 can be obtained through the space 554D in bobbin 554A. Referring back to FIG. 5, it can be seen that there is a passageway that extends from the space to the coupling assembly 540 in general, and the sleeve 544 in particular. In addition, there is a passageway that extends from the space in the bobbin 554A through spacer 522 and through spring 557. Thus, there is a passageway extending from a side of the vibrating electromagnetic transducer-coupling assembly 580 facing away from the coupling assembly 540 to a side of the assembly 580 facing the coupling assembly 540. Some utility of this passageway with respect to this embodiment will now be described.

With respect to the embodiment of FIG. 5, it is noted that the sleeve 544 is interference-fit into the hollow portion of bobbin extension 554E. In this regard, an outer diameter of the sleeve 544 that fits in the hollow portion of the bobbin extension 554A is larger, at a given temperature, then the interior interfacing diameter of that hollow portion at that same temperature. In an exemplary embodiment, the attachment depicted in FIG. 5 is achieved by a press-fit, while in an alternative embodiment, the attachment depicted in FIG. 5 is achieved via a shrink-fit and/or an expansion-fit (achieved via for example temperature differentiation of the components). It is noted that in an alternate embodiment, sleeve 544 is slip-fit to the bobbin extension 554E, and an adhesive or the like is used to secure sleeve 544 to bobbin extension 554E. It is further noted that while the embodiment of FIG. 5 depicts the connection as being between the sleeve 544 and the bobbin extension 554E, in alternate embodiments, the connection can be between the sleeve 544 and other components, such as, by way of example and not by way of limitation, the coupling 541, etc.

It is noted that while the embodiment of FIGS. 5 and 6 are depicted has having a snap-coupling, in an alternate embodiment, the coupling could be magnetic. As noted above, any device, system or method that can enable coupling of the removable component to an implanted prosthesis can be utilized in at least some embodiments providing that the teachings detailed herein and/or variations thereof can be practiced. In this regard, in an exemplary embodiment, a magnet or other ferromagnetic material can be press-fit or interference fit, etc., into the space in the bobbin extension 554E. Removal of the ferromagnetic material can be akin to the removal teachings with respect to the sleeve detailed herein and/or variations thereof.

Figure 7A:
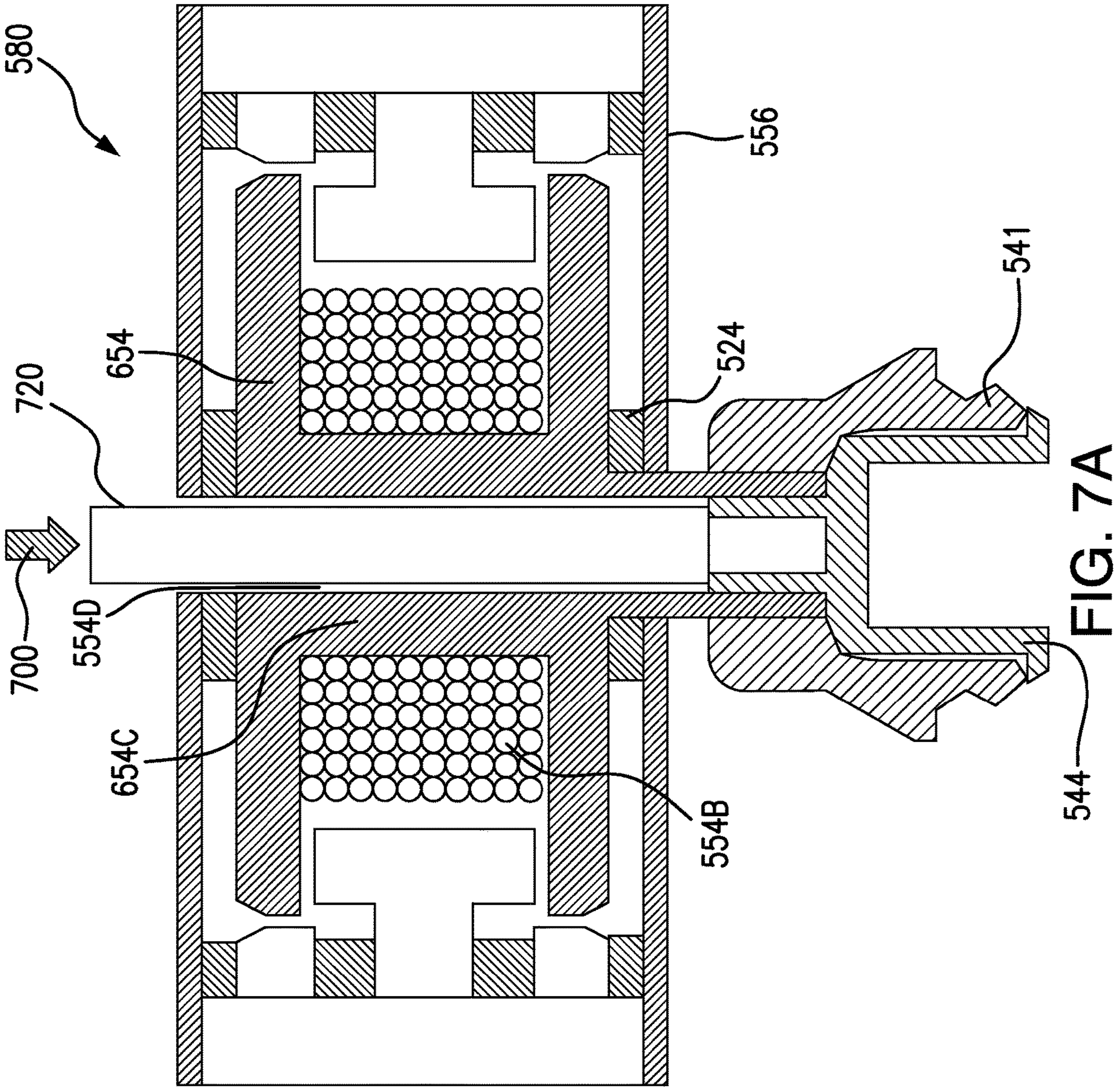
FIGS. 7A-7C are cross-sectional views illustrating process actions associated with removal of a component from the assembly of FIG. 5.
Figure 7B:
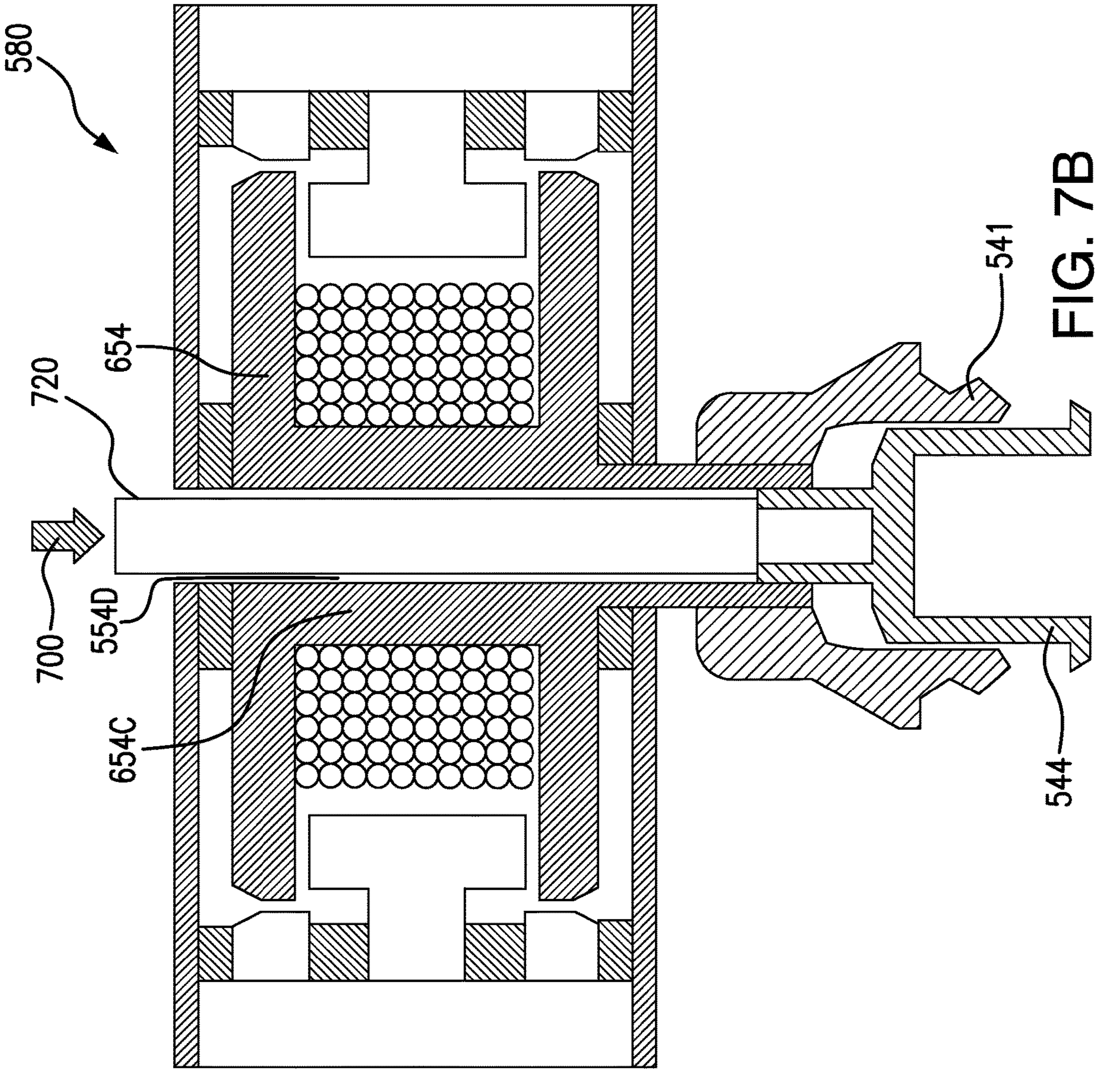
Figure 7C:
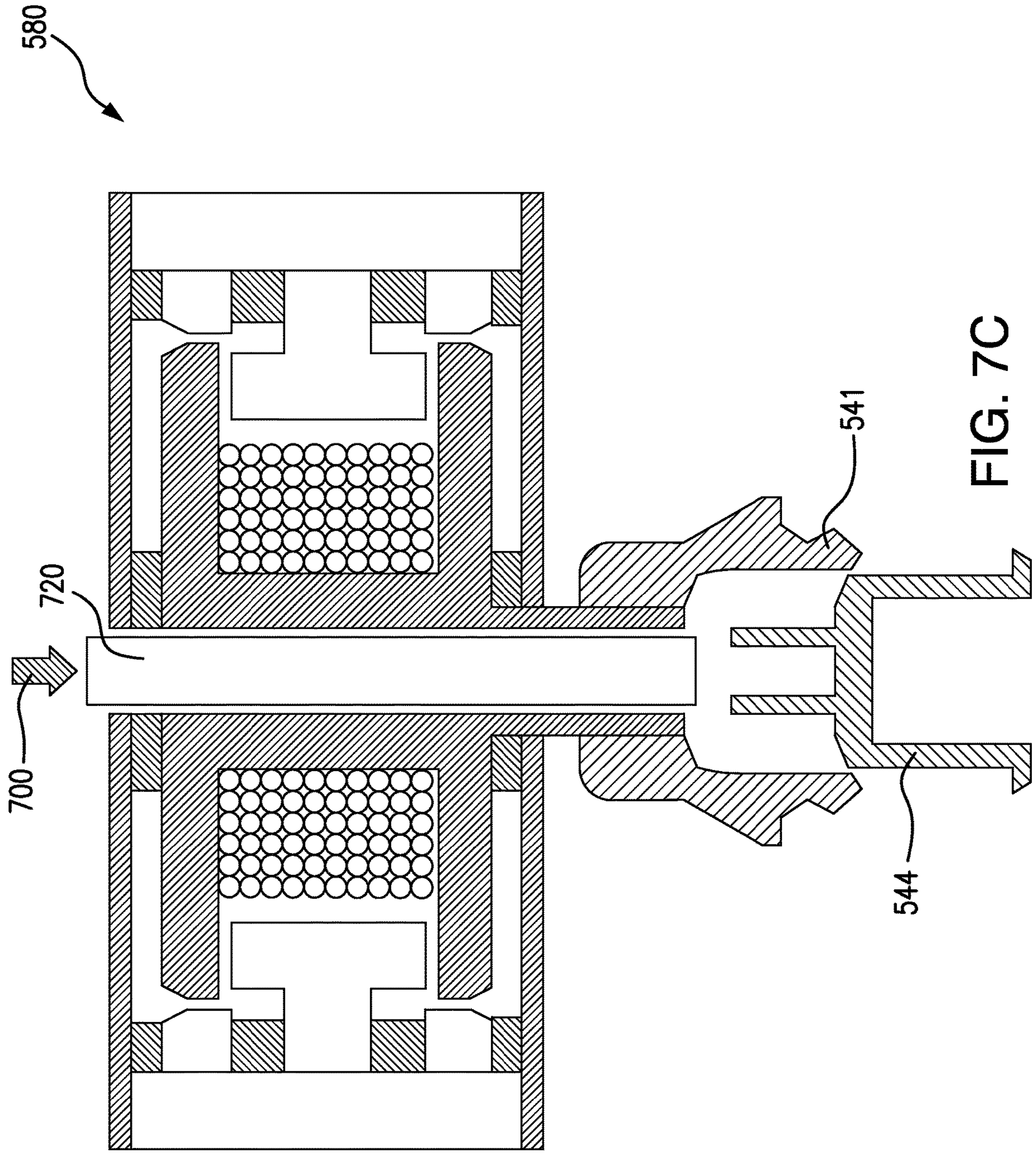

As noted above, and embodiment enables access to the sleeve 544 to be obtained through the space 554D in bobbin 554A. Referring now to FIG. 7A, the access that is enabled can be used in a utilitarian manner such that a drift 720 can be extended through the passageway from a side of the electromagnetic transducer 550 opposite the sleeve 554 to the sleeve 554. In an exemplary embodiment, by applying a downward force onto drift 720 at a location on one side of the electromagnetic transducer 550, as represented by arrow 700, this force can be transmitted through the passageway to sleeve 544 via the drift 720. Upon application of a sufficiently high force to the drift 720, and corresponding transmission of the force via drift 720 through the passageway to sleeve 644, the friction forces and/or adhesive forces, etc., that retain sleeve 644 to bobbin extension 554E can be overcome, and thus sleeve 644 can be removed from bobbin extension 554E. FIGS. 7B and 7C schematically depict a sequence of a method of removal of sleeve 544 from extension 554E.

It is noted that with respect to the actions depicted in FIGS. 7A to 7C, a reaction assembly can be utilized to provide a reaction force against the force applied to the drift 720. By way of example only and not by way of limitation, a reaction assembly might be extendable about the exposed portion of the bobbin extension 554D between spring 556 and coupling 541, that would provide an upward reaction force against the spring 556 or a spacer placed between the spring 556 and the reaction assembly at a location proximate to the bobbin extension 554E. In an exemplary embodiment, this reaction assembly can be made of moving components that move to envelop the bobbin extension 554E. In an alternate embodiment, the reaction assembly can include a platform that has an opening extending from the side thereof into the platform (e.g., a notch, a “U” shape, etc.) such that the bobbin extension 554E can be moved into that opening so that the platform can interface with the spring 556 and/or a spacer proximate the bobbin extension 554E. Any device system or method that can be utilized to provide a reaction force can be used in at least some embodiments.

Figure 8A:
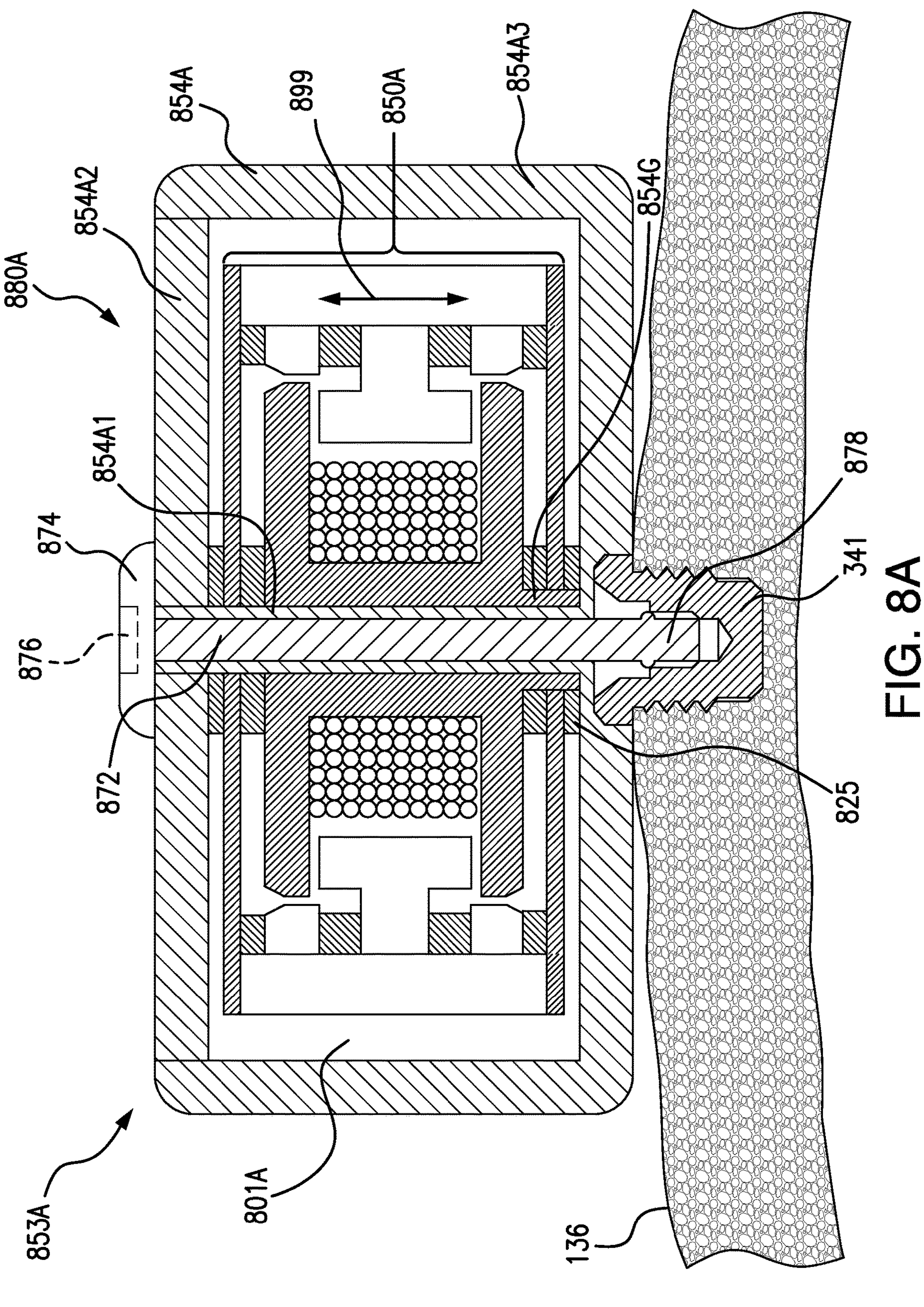
FIGS. 8A and 8B are cross-sectional views of an example of a vibratory apparatus of the embodiment of FIG. 4.

Referring now to FIG. 8A, there is an alternate embodiment that is utilized in a transcutaneous bone conduction device, such as that according to the embodiment of FIG. 4 above (body tissue other than bone 136 has been removed for clarity). In particular, FIG. 8A depicts a vibrating element 853A of an active transcutaneous bone conduction device corresponding to vibrating element 453 of FIG. 4. Vibrating element 853A includes an electromagnetic transducer 850A enclosed within a housing 854A. The electromagnetic transducer 850A of this exemplary embodiment at least substantially corresponds to electromagnetic transducer 550 detailed above, with the exception that the bobbin extension 854G, corresponding to bobbin extension 554E of the embodiment of FIG. 5, is not as elongate as it is in the embodiment of FIG. 5. As can be seen, the bobbin extension extends through spacer 825 to a wall of housing 854A. In some embodiments, there is no such extension. By way of example, the electromagnetic transducer 850A is supported entirely by a spacer.

As can be seen, housing 854A entirely envelops the transducer 850A. In an exemplary embodiment, the housing 854A provides a hermetically sealed and/or helium tight enclosure 801A. The bottom housing wall of housing 854A is contoured to the top surface of the bone fixture 341. In an exemplary embodiment, the housing is contoured to the outer contours of the bone fixture 341, as can be seen. The portions of the housing that interface with the bone fixture thus form a bone fixture interface section that is contoured to the exposed section of the bone fixture 341. In an exemplary embodiment, the sections are sized and dimensioned such that at least a slip-fit or an interference-fit exists with respect to the sections. In other embodiments, it is noted that the contouring can be different. Indeed, in some embodiments, there are no contours at all; the bottom housing wall sits on top of the upper surface of the bone fixture 341. Collectively, the portions of the housing that interface with the bone fixture and the electromagnetic vibrator 850A form vibrating electromagnetic transducer-coupling assembly 880A.

In an exemplary embodiment, the interface between the electromagnetic vibrator 850A and the other pertinent components of the vibrating element 853A is sufficient to establish a vibrational communication path such that, providing a suitable interface between the vibrating element 853A and the bone fixture 341 and/or bone 136, such that the vibrational communication effectively evokes a hearing percept.

These interfacing components of the housing 854A correspond to a connection apparatus that is in fixed relationship to the bobbin of the electromagnetic transducer 850A, where the apparatus is configured to indirectly transfer vibrational energy to or from the electromagnetic transducer 850A. Any device, system, or method that will enable the housing 854A to interface with the bone fixture 341 can be utilized in some embodiments providing that the teachings detailed herein and/or variations thereof can be implemented. By way of example only and not by way of limitation, such teachings include the transmission of vibrations through the housing 854A to or from the electromagnetic transducer 850A, such as by way of example, to evoke a bone conduction hearing percept.

Still referring to FIG. 8A, it can be seen that housing 854A includes an interior housing wall 854A1 that extends from a top of the housing 854A to the bottom of the housing 854A. Accordingly, in the embodiment of FIG. 8A, the housing 854A is a "doughnut" shaped housing when viewed from the top or the bottom. A cross-section of the wall 854A1 taken on a plane normal to the longitudinal axis of the vibrating element 853A is circular, bounded by an inner circle and an outer circle. Accordingly, there is a passageway through the housing 854A from the top to the bottom/vice versa, and in the embodiment depicted in FIG. 8A, a portion of the bone fixture 341 fits into that passage, although in other embodiments, it does not fit therein. As can be seen from FIG. 8A, wall 854A1, and thus the passageway, extended through the space through the bobbin of the electromagnetic transducer 550. This provides access to the connection apparatus of the vibrating elements 853A (e.g., the contoured bottom wall of housing 854A, etc.) through the space in the bobbin. In the exemplary embodiment depicted in FIG. 8A, a through bolt 874 extends through the space inside the housing walls 854A1, and thus the space inside the bobbin. In an alternate embodiment, other fixation systems configured to connect to the bone fixture can be utilized. The through bolt 874 is configured to be placed into tension by screwing a threaded end 878, which is connected to the head via shaft 872, into a receptacle of the bone fixture 341, where, in an exemplary embodiment, the receptacle corresponds to a receptacle for an abutment screw of a percutaneous bone conduction device. As can be seen, the head is larger than the diameter of the passageway through the housing/bobbin, and thus the through bolt 874 positively retains the housing to the bone fixture. This provides a compressive force on the top of housing 854A via the bolt head and the bottom of housing 854A via the bone fixture 341. In an exemplary embodiment, all or part of the head can extend into the housing (e.g., the top of the head can be flush or recessed with the top of the housing). In an exemplary embodiment, the bolt includes a uni-grip receptacle 876 configured to receive a tool so that a torque can be applied to the through bolt 874 to screw the through bolt 874 into the bone fixture 341. That is, in an exemplary embodiment, the bold 874 is configured so that the same tools and procedures that are used to install and/or remove an abutment screw to/from bone fixture 341 can be used to install and/or remove bolt 874 to/from the bone fixture 341. The portions of the through bolt 874 that interface with the bone fixture 341 substantially correspond to an abutment screw used to attach an abutment to the bone fixture, thus permitting bolt 874 to readily fit into an existing bone fixture used in a percutaneous bone conduction device.

Upon sufficient tightening of the bolt 874, the vibrating element 853A/vibratory transducer-coupling assembly 880A is substantially rigidly attached to bone fixture 341 to place the vibrating element 853A into vibrational communication with the bone fixture 341 so as to, in an exemplary embodiment, effectively evoke a bone conduction hearing precept. The attachment formed between the vibrating element 853A and the bone fixture 341 is one that inhibits the transfer of vibrations to or from the vibrating element 853A from or to the bone fixture 341 as little as possible. Moreover, an embodiment is directed towards vibrationally isolating the vibrating element 853A from the skull 136 as much as possible. That is, in an embodiment, except for a path for the vibrational energy through the bone fixture, the vibratory apparatus 853A is vibrationally isolated from the skull. In other embodiment, other vibration paths may exist (e.g., such as through the housing directly into the skull/visa-versa. Along these lines, however, it is noted that in some embodiments, the fixation system disclosed herein and/or variations thereof, enable a vibrational path to/from the bone comprising rigid components to be maintained irrespective of most bone growth scenarios. In this regard, instead of utilizing a housing/bone interface, where the bone may grow away from the housing, because the vibratory apparatus 853A is attached to the bone fixture 341 which in turn is embedded into the bone 136, even if the bone 136 receives a way from the housing and/or the upper portions of the bone fixture, the region vibrational path is always present. Indeed, some embodiments, some or all of the vibratory apparatus 853A is held above the bone 136 so that there is little or no direct contact between the skull 136 and the vibratory apparatus 853A.

The embodiment of FIG. 8A and/or variations thereof can enable a method of transmitting vibration to or from an electromagnetic transducer, such as electromagnetic transducer 850A, that is subcutaneously implanted in a recipient. Further, in this exemplary method, the method is executed utilizing an electromagnetic transducer that is in vibrational communication with a single point fixation system securing the electromagnetic transducer to bone of the recipient at a single point such as that depicted in FIG. 8A. In this regard, in an exemplary embodiment, at least a substantial amount of the vibratory energy (including all of the vibrational energy) transferred to and/or from the electromagnetic transducer travels through this single point fixation system.

In an exemplary embodiment of the embodiment of FIG. 8A, the housing 854A includes a lid 854A2 having a hole therethrough for wall 854A1 to extend therethrough, and the bottom of the housing 854A forms a hollow cylinder 854A3 with a cylinder therein (854A1) with a fully opened first end (i.e. the top)—so that the electromagnetic transducer 850A can fit therein, followed by the lid to close that end), and a partially closed second end (i.e. the bottom)—partially closed so the bolt 876 can fit therethrough. The joints of the housing elements (544A1, 854A2 and 854A3) are welded together, such as via laser welding and/or closed by another system. The welding (or other closure system) is such that the interior of the housing 854A provides a hermetically sealed and/or helium tight enclosure 801A.

Figure 8B:
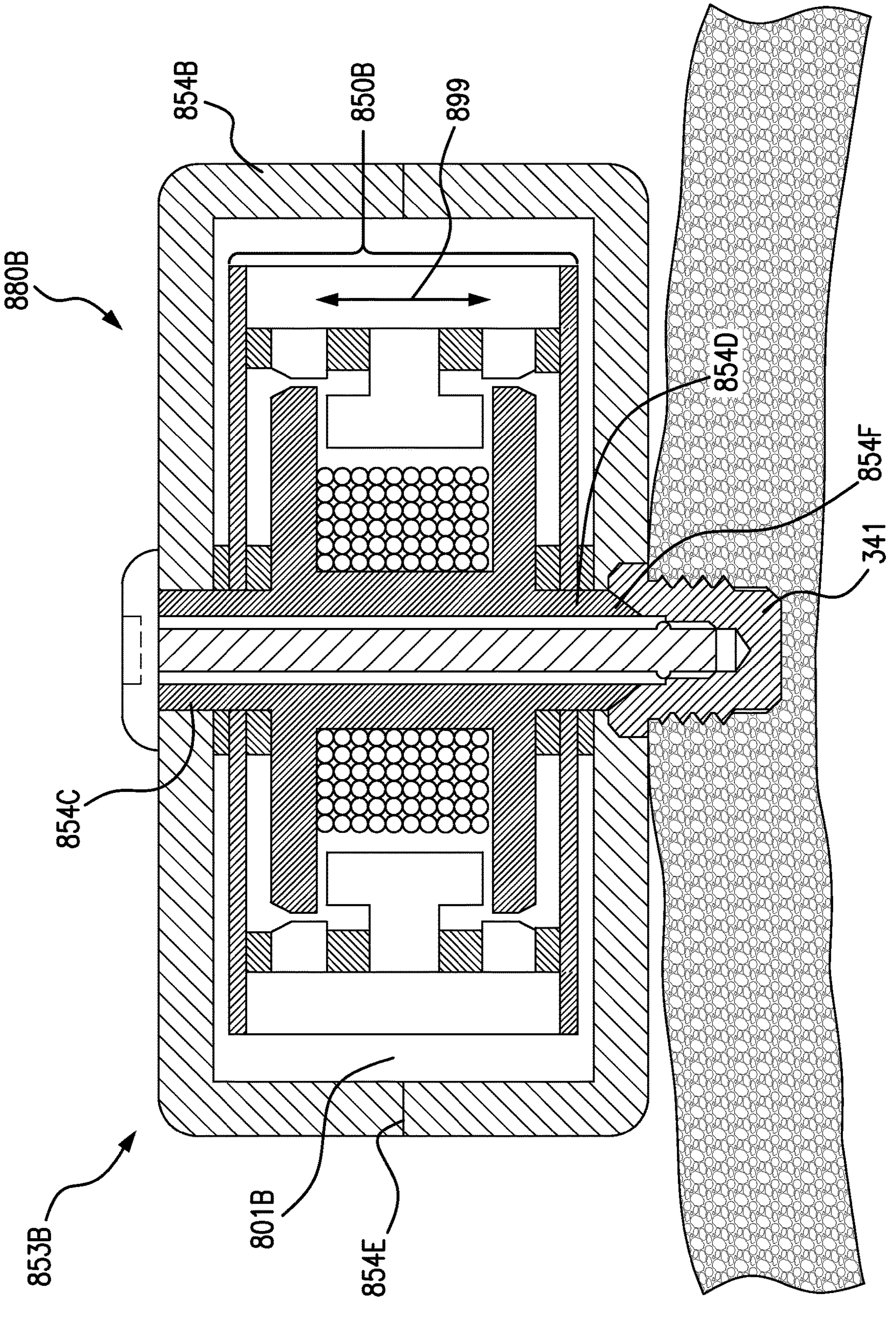

FIG. 8B depicts an alternate embodiment of the embodiment of FIG. 8A, including a vibrating element 853B also corresponding to vibrational element 453 of FIG. 4. Vibrating element 853B includes an electromagnetic transducer 850B enclosed within a housing 854B. The electromagnetic transducer 850B of this exemplary embodiment substantially corresponds to electromagnetic transducer 850A detailed above, with the exception that there also is present a bobbin extension 854C at the top of the transducer 850B in addition to the extension 854D at the bottom. As can be seen, the bobbin extension at the top extends through a spacer at the top to a wall of housing 854B.

Unlike housing 854A, housing 854B does not entirely interpose a barrier between an ambient environment and the electromagnetic transducer 850B. Instead, a portion of the interior of the bobbin is used to establish a portion of the passageway through the housing 854B from the top to the bottom and vice-versa, and in the embodiment depicted in FIG. 8B, a portion of the bone fixture 341 fits into that passage. In an exemplary embodiment, the walls of the housing 854B are welded (e.g., laser welded) to the bobbin extensions at the top and the bottom to achieve the hermetic seal and/or helium-tight seal between interior 801B and the ambient environment. In an exemplary embodiment, the housing walls are half shells that mate about a lateral axis thereof, which is also welded as depicted at mating section 854E. Alternatively, the top of the housing 854B is a lid having a hole therethrough for the upper bobbin extension, and the bottom of the housing 854B forms a hollow cylinder with a fully opened first end (i.e. the top)—so that the electromagnetic transducer 850B can fit therein, followed by the lid to close that end), and a partially closed second end (i.e. the bottom)—partially closed so the lower bobbin extension can fit therethrough. The welding (or other closure forms) is such that the interior of the housing 854B in combination with the bobbin provides a hermetically sealed and/or helium tight enclosure 801B.

As with the embodiment of FIG. 8A, the bottom housing wall of housing 854B is contoured to the top surface of the bone fixture 341, although in other embodiments, the contouring can be different, if present at all.

Still referring to FIG. 8B, it can be seen that a portion 854F of the bobbin extension 854D extends into the bone fixture 341. An exemplary embodiment, the contours of portion 854F that interface with the bone fixture 341 corresponds to portions of an embodiment of a percutaneous bone conduction device. In an exemplary embodiment, the contouring of the portions 854F and its contact with the bone fixture 341 further enhance the vibrational communication between the electromagnetic transducer 850B and the bone fixture 341, at least as compared to an embodiment without the portions 854F. Accordingly, in an exemplary embodiment, there is a vibrating electromagnetic transducer-coupling assembly 880B that has a bobbin of the electromagnetic transducer that is in direct contact with a bone fixture. Further, in an exemplary embodiment, the passageway through the bobbin/electromagnetic transducer extends all the way through the transducer to a receptacle of the bone fixture 341.

In an exemplary embodiment, the interface between the electromagnetic vibrator 850B and the other pertinent components of the vibrating element 853B, if applicable, and/or with the bone fixture 341, is sufficient to establish a vibrational communication path such that, providing a suitable interface between the vibrating element 853B and the bone fixture 341 and/or bone 136, the vibrational communication effectively evokes a hearing percept.

An exemplary embodiment of the embodiments of FIGS. 8A and 8B and/or variations thereof has utility in that the vibrating element 853A/853B, or at least the through bolt 874, can be removed without power tools or the like/can be removed via application of a torque to the through bolt 874 that is lower than that which might be the case if the through bolt 874 was osseointegrated to bone. In this regard, the passage through the electromagnetic transducer 850A/850B enables torque to be applied to the through bolt 874 and thus to the threads thereof that interface with the bone fixture 341, from the side of the vibrating element opposite the bone 136. Because the through bolt 874 interfaces with the bone fixture 341, it should not become osseointegrated to the bone 136 (instead, the bone fixture 341 is osseointegrated to the bone 136). Accordingly, a relatively strong level of fixation can be achieved between the vibrating element and the bone, at least indirectly, while also enabling removal of the through bolt 874 with relatively lower torque than that which would be the case in the event that the through bolt 874 was osseointegrated to the bone 136.

In an alternate embodiment, the housing of the vibrating element 853A/853B can become osseointegrated, at least in part, to the bone 136. In this regard, an exemplary embodiment includes accessing the interior of the housing by, for example removing a lid thereof, and removing the through bolt. In an exemplary embodiment, the through bolt extends through the lid, while in an alternate embodiment, the through bolt extends through the electromagnetic transducer, but does not extend through the lid (e.g., the head of the bolt is contained in the housing, and is thus not exposed to the ambient environment). Removal of the lid and the through bolt, in whatever order, enables the electromagnetic transducer to be removed from the housing without the hosing being removed (or at least the portions that might be osseointegrated to the bone)/thus without disturbing any osseointegration between the housing and the bone (if present). Thus, a new transducer can be inserted into the housing, and secured in place via the through bolt, again without disturbing the osseointegration between the housing and the bone (if present). There is, accordingly, a method that entails removal and/or insertion of an electromagnetic transducer according to the actions thus detailed.

It is noted at this time that while the embodiments of FIGS. 8A and 8B are depicted as being directly connected to bone, in an alternate embodiment, the vibrating elements (e.g., 853A and/or 853B) are connected to a tooth which in-turn is connected to bone. Any attachment to any tissue which will enable the teachings detailed herein and/or variations thereof to be practiced can be utilized in some embodiments, at least if such enables vibrational communication that effectively evokes a hearing percept It is noted that in the embodiment of FIGS. 8A and 8B, the primary direction of motion of the counterweight assembly of the electromagnetic transducer is parallel to the longitudinal direction of the electromagnetic transducer, parallel to the direction of extension of the through bolt 874, parallel to the direction of extension of the space through the bobbin, and parallel to the longitudinal axis of the fixture 341, and normal to the tangent of the surface of the bone 136 (or, more accurately, an extrapolated surface of the bone 136) local to the bone fixture 341. This primary direction of motion is represented by arrow 899. It is noted that by "primary direction of motion," it is recognized that the counterweight assembly may move inward towards the longitudinal axis of the electromagnetic vibrator owing to the flexing of the spring (providing, at least, that the spring does not stretch outward, in which case it may move outward or not move in this dimension at all), but that most of the movement is normal to this direction.

At least some of the embodiments detailed herein and/or variations thereof can have utility in by enabling the electromagnetic transducer to be placed into vibrational communication with a recipient fixation component (e.g. bone fixture 341) and maintained in vibrational communication via a mechanical connection extending through the electromagnetic transducer. That is, the electromagnetic transducer can be locationally fixed to the recipient fixation component via this mechanical connection extending through the electromagnetic transducer. Accordingly, at least some embodiments have utility in that an implantable vibrational element can be placed over a bone fixture or the like or other single point fixation system such that the outer boundaries of the vibrational element eclipse the bone fixture, and the electromagnetic transducer of the vibrational element can be aligned with the bone fixture (e.g. the longitudinal axes of the bone fixture and the electromagnetic transducer are parallel and coaxial with one another) and the implantable vibrational element can still be secured to the bone fixture by extending a mechanical connection through the electromagnetic transducer. This can have utility in that little to no torque is applied to the implantable vibrational element during a securement process of the implantable vibrational element to the bone fixture—the torque is substantially (including entirely) transferred through the element. This in turn can have utility in that such torque could potentially deform the housing of the implantable vibrational element and/or deform the electromagnetic transducer thereof and/or misaligned components thereof, any of which could potentially have a deleterious effect on implantable vibrational element—an element that is implanted in a human being.

It is noted that while the embodiment of FIG. 5 is disclosed as not including a mechanical connection extending through the electromagnetic transducer that locationally fixes to a recipient fixation component (e.g., the connection apparatus 540), in an alternate embodiment, a bolt or the like can extend through the bore 554D from the side of the electromagnetic transducer 550 opposite the connection apparatus 540 to the connection apparatus 540. In an exemplary embodiment, the sleeve 544 and the coupling 541 can be securely connected to one another and/or can be an integral or a monolithic component, such that a retention force applied to one (e.g. the sleeve 544 as a result of bolt threads screwing into a portion thereof inside the bobbin extension 554E, this portion being, in some embodiments, thicker than that depicted in FIG. 5 so as to provide additional thread grip, although in other embodiments, additional thickness is not present) via the bolt extending through bore 554D is also applied to the other. Other configurations can also enable the locational fixation via mechanical connection through the electromagnetic transducer. For example, in the absence of the sleeve 544, the coupling 541 could extend across the bottom of bobbin extension 554E, thus providing structure for the threads of the bolt to grip.

In an alternative embodiment, the coupling 541 is not present, and in its place is a component configured to interface with a skin penetrating abutment (e.g. such as abutments 620 of FIG. 6). That is, unlike the embodiment depicted in FIG. 6, the "end" (the part that interfaces with the abutment) of the removable component of the percutaneous bone conduction device does not snap-fit to the abutment. Indeed, in alternate embodiments of this alternate embodiment, the "end" (the part that interfaces with the abutment) does not include any automatic securement structure (e.g., no magnets, etc.), at least not in the traditional sense. In such alternate embodiments, a mechanical connection such as a bolt or the like can extend through the electromagnetic transducer to be threadably attached to the abutment (which in this embodiment has threads thereon (either male or female)) and/or the abutment screw (which, in some embodiments, includes male threads about the abutment screw head).

In an alternate embodiment, the coupling 541 is not present and in its place and/or in addition there is a component configured to actuatably couple to an abutment. By "actuatably couple," it is meant that a component can be actuated to couple and decouple the removable component of the bone conduction device to/from the abutment. For example, a ball detente system can be utilized where a force applied on the opposite side of the electromagnetic transducer from the abutment is transmitted through the electromagnetic transducer to ball detents on the coupling side, thus actuating the ball detents to couple and uncouple, to and from, respectively, the abutment (or other corresponding structure). In an exemplary embodiment, a spring-loaded shaft or the like can extend through the electromagnetic transducer, with an exterior button on the opposite side of the removable component from the abutment. This button can be mechanically coupled to the shaft. Depressing the button applies a compression force onto the shaft working against the spring, which moves the shaft. The ball detents, being in mechanical communication with the shaft, can be actuated as a result of movement of the shaft, where, for example, movement of the shaft permits the ball detents to be moved (e.g., due to placement of a recess in the shaft proximate the ball detents into which the ball detents enter) to a location where the removable component can be decouple from the abutment. Conversely, removal of the force onto the button, and thus the force applied to the shaft, causes the shaft to spring back to a location where the ball detents are forced to a location where the removable component cannot be decouple from the abutment.

Any configuration that can be utilized to enable the electromagnetic transducer to be locationally fixed to a recipient fixation component via mechanical connection extending through the transducer can be utilized in at least some embodiments. In an exemplary embodiment, this is the case if such configuration is sufficient to establish a vibrational communication path such that, providing a suitable interface between the removable component and the implanted component and the bone, the vibrational communication effectively evokes a hearing percept.

Figure 8C:
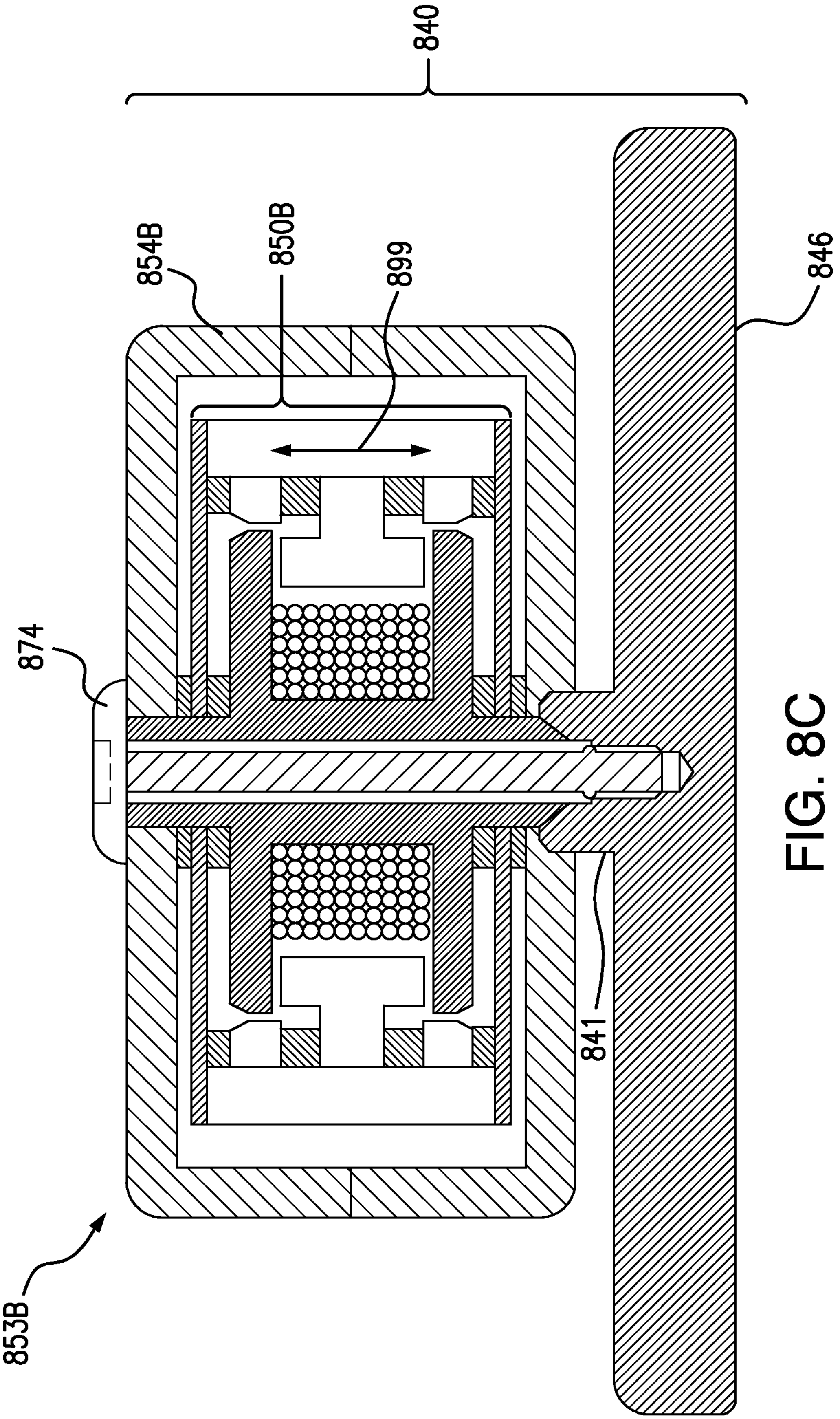
FIG. 8C is a cross-sectional view of an example of the external component of the embodiment of FIG. 3.

While the embodiments detailed herein up to this point have tended to focus on percutaneous bone conduction devices and active transcutaneous bone conduction devices, variations of these embodiments are applicable to passive transcutaneous bone conduction devices. In this regard, the fixation regimes and methods described herein and/or variations thereof are applicable to fixation of an electromagnetic transducer to a pressure plate of a passive transcutaneous bone conduction device, such as the plate 346 of FIG. 3, where a vibrating electromagnetic actuator 342 is the electromagnetic transducer. This can be the case in an exemplary embodiment where such connection results in an interface between the given electromagnetic vibrator and the plate 346 that is sufficient to establish a vibrational communication path such that, providing a suitable interface between the plate 346 and the vibratory portion 355, the vibrational communication effectively evokes a hearing percept. In an exemplary embodiment, the plate can have a component analogous to or the same as the portions of the fixture 341 that interface with the vibratory apparatus 853A and/or 853B detailed above. Along these lines, FIG. 8C depicts an exemplary embodiment of an external component 840 of a passive transcutaneous bone conduction device according to that of FIG. 3. As can be seen, component 853B of FIG. 8B is attached to a plate 846 (corresponding to plate 346 of FIG. 3) via an extension portion 841 of plate 846. In an exemplary embodiment, extension portion 841 corresponds to, at least with respect to the interfacing components with component 853B, bone fixture 341, although plate 846 and extension 841 form a monolithic component. That said, in an alternate embodiment, the plate can be configured to receive a bone fixture 341. Such an exemplary embodiment can provide utility with respect to manufacturing an external device of a passive transcutaneous bone conduction device. In an alternate embodiment, component 853A of FIG. 8A is utilized instead of 853B.

In an alternate embodiment, the electromagnetic transducer 550 of FIG. 5 is utilized instead of component 853B of FIG. 8B. In such an exemplary embodiment, a bolt, such as bolt 876, can extend through bore 554D to plate 846 in a manner analogous to and/or the same as that of FIG. 8C. Along these lines, the bobbin extension 554E can be modified from that depicted in FIG. 5 so as to interface with extension 841 (e.g., it can have an end akin to bobbin extension of FIG. 8B).

At least some of the embodiments detailed herein and/or variations thereof enable certain methods. In this regard, in an exemplary embodiment, there is a method that entails transmitting a force through a space extending through an electromagnetic transducer, thereby at least one of fixing or unfixing a component to or from, respectively, the electromagnetic transducer. For example, referring to FIGS. 7A-7C, the drift 720 transmits the force applied thereto through bore 554D, and thus through the space extending through the electromagnetic transducer 550. With respect to the embodiments of FIGS. 7A-7C, the force is a compressive force that reacts against sleeve 544 (a connection component). Still further by way of example, referring now to FIGS. 8A and 8B, a torque applied to uni-grip receptacle 876 (which can be any type of receptacle or, in the alternative, any type of protrusion, that enables a wrench or screwdriver any other device configured to impart torque onto another component to so impart torque onto the bolt 876), and thus the through bolt 874, is transmitted through the bore 554D to the threaded end 878, and thus a force is transmitted through the space extending through the electromagnetic transducer 550. With respect to the embodiments of FIGS. 8A-8B, the force is a rotational force that ultimately interfaces with implanted bone fixture 341.

The just detailed methods can include the action of at least one of fixing or unfixing a component to or from, respectively, the electromagnetic transducer. It is noted that the component fixed or unfixed to or from the electromagnetic transducer can be fixed directly or indirectly to the electromagnetic transducer. For example, with respect to the embodiment of FIG. 5, owing to the bobbin extension 554E, the sleeve 544 (a component) is directly fixed to the electromagnetic transducer 550. However, if a separate component was present in the place of the bobbin extension 554A, the sleeve 544 would be indirectly fixed to the electromagnetic transducer 550. Still further by example, with respect to the embodiment of FIG. 8A, owing to the presence of the housing wall interposed between the electromagnetic transducer 850A and the bone fixture 341, the bone fixture 341 (a component that is fixed or unfixed to or from respectively the electromagnetic transducer) is indirectly fixed to the electromagnetic transducer 850A. Conversely with respect to the embodiment of FIG. 8B, owing to the fact that the bobbin extension includes portions 854F, the electromagnetic transducer 850B is directly fixed to the bone fixture 341.

An embodiment includes features of a wall thickness between the coils of the bobbin and the space inside the bobbin as it relates to a dynamic magnetic flux traveling through the wall, as will now be described.

Figure 9:
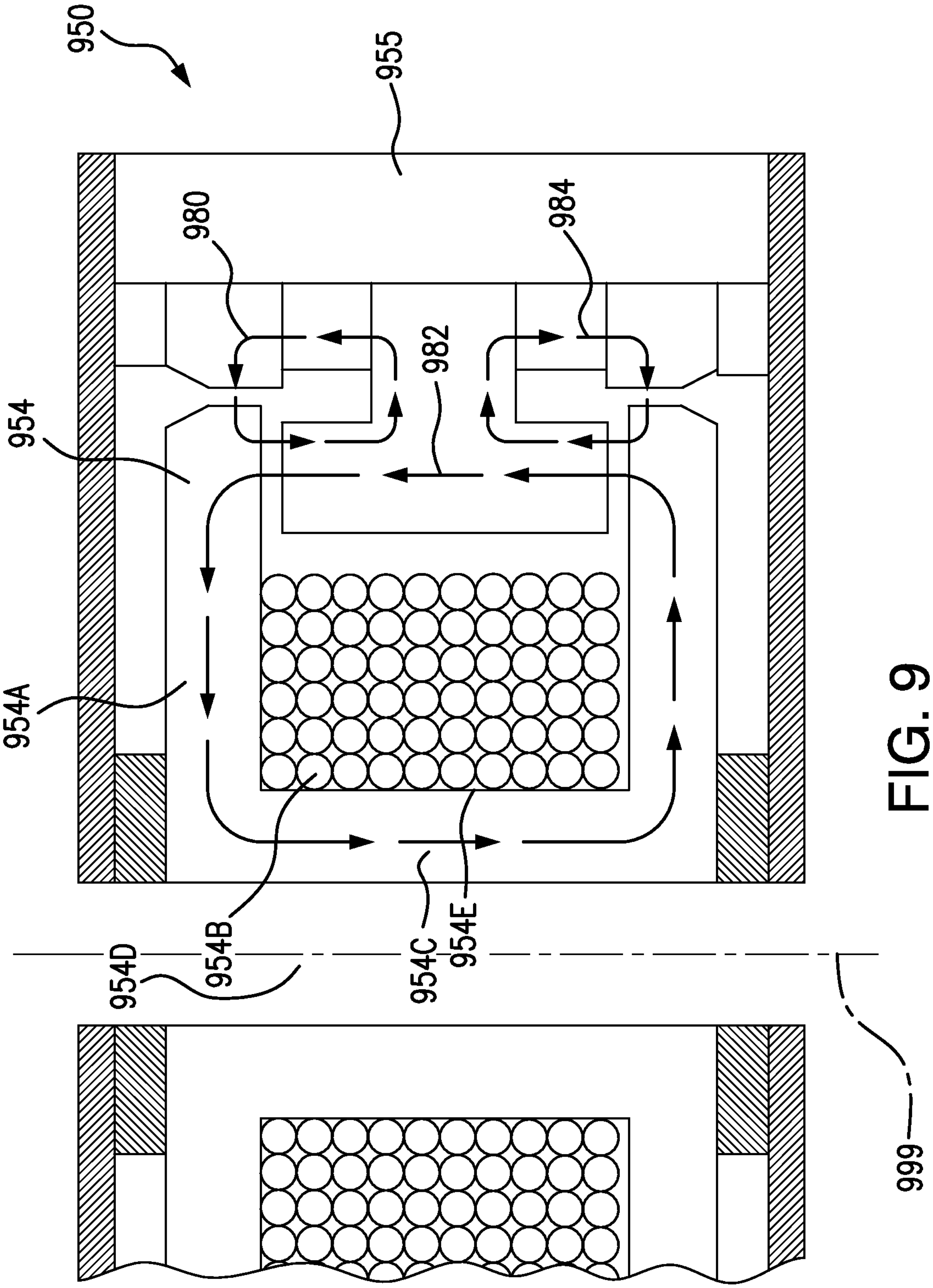
FIG. 9 depicts static magnetic flux in an exemplary electromagnetic transducer.

Referring now to FIG. 9, a portion of an electromagnetic transducer 950 is depicted. The electromagnetic transducer 950 is identical to electromagnetic transducer 550 detailed above, with the exception that there is no bobbin extension 554E, and the components in proximity thereto are adjusted accordingly (e.g., the spacer and the bottom spring are extended). In other embodiments, electromagnetic transducer 950 can correspond exactly to any of the electromagnetic transducers detailed herein and/or variations thereof. In this regard, the teachings below can be applicable, in at least some embodiments, to any of the electromagnetic transducers detailed herein and/or variations thereof unless otherwise specified, as is the case in the broader context that any of the specific teachings detailed herein and/or variations thereof can be applicable to any of the embodiments detailed herein and/or variations thereof unless otherwise specified.

As with bobbin assembly 554, bobbin assembly 954 is configured to generate a dynamic magnetic flux when energized by an electric current. In this exemplary embodiment, bobbin 954A is made of a material that is conducive to the establishment of a magnetic conduction path for the dynamic magnetic flux. Additional aspects of this feature are described in greater detail below.

FIG. 9 depicts the respective static magnetic flux 980 and static magnetic flux 984 of permanent magnets 558A and 558B, and dynamic magnetic flux 982 of the coil in the electromagnetic transducer 950 when the coil is energized according to a first current direction and when bobbin assembly 954 and counterweight assembly 955 are at a balance point with respect to magnetically induced relative movement between the two (hereinafter, the "balance point"). That is, while it is to be understood that the counterweight assembly 955 moves in an oscillatory manner relative to the bobbin assembly 954 when the coil is energized, there is an equilibrium point at the fixed location corresponding to the balance point at which the counterweight assembly 954 returns to relative to the bobbin assembly 954 when the coil is not energized. It is noted that when the current direction is reversed, the direction of the dynamic magnetic flux is reversed from that depicted in FIG. 9

It is noted that FIG. 9 does not depict the magnitude/scale of the magnetic fluxes. In this regard, it is noted that in some embodiments, at the moment that the coil is energized and when bobbin assembly 954 and counterweight assembly 955 are at the balance point, relatively little, if any, static magnetic flux flows through the core of the bobbin 954A/the hole of the coil formed as a result of the coil being wound about the core of the bobbin 954A. Accordingly, FIG. 9 depicts this fact. However, in some embodiments, it is noted that during operation, the amount of static magnetic flux that flows through these components increases as the bobbin assembly 954 travels away from the balance point (both downward and upward away from the balance point) and/or decreases as the bobbin assembly 954 travels towards the balance point (both downward and upward towards the balance point).

It is noted that the directions and paths of the static magnetic fluxes and dynamic magnetic fluxes are representative of some exemplary embodiments, and in other embodiments, the directions and/or paths of the fluxes can vary from those depicted.

Still referring to FIG. 9, it can be seen that the dynamic magnetic flux 982 travels through the bobbin core 954C about which coils 954B extend. In the embodiment of FIG. 9, because bobbin 954A is made of a magnetically permeable material (e.g., a highly permeable material), the bobbin core 954C is a magnetic core. In this regard, effectively all, if not all, of the dynamic magnetic flux 982 travels through the material of the bobbin 954A. That is, essentially no dynamic magnetic flux travels through the space 954D in the bobbin. In this regard, the electromagnetic transducer 550 is configured such that the effective dynamic magnetic flux travels through the material of bobbin 954A. As used herein, effective magnetic flux refers to a flux that produces a magnetic force that impacts the performance of vibrating electromagnetic actuators detailed herein and/or variations thereof, as opposed to trace flux, which may be capable of detection by sensitive equipment but has no substantial impact (e.g., the efficiency is minimally impacted) on the performance of the vibrating electromagnetic actuator. That is, the trace flux will typically not result in vibrations being generated by the electromagnetic actuators detailed herein and/or typically will not result in the generation electrical signals in the absence of vibration inputted into the transducer. Accordingly, embodiments include electromagnetic transducers where trace amounts of dynamic magnetic flux, but not effective amounts, travel through space 954D. Of course, some embodiments are such that not even trace amounts travel through space 954D.

It is noted that in an exemplary embodiment, the bobbin 954A and/or any of the bobbins detailed herein and/or variations thereof is made from, for example, Vacofer, and the values detailed herein are applicable to such a bobbin, although the values can also be applicable to other bobbins. In some embodiment, soft magnetic material, such as, for example and not by way of limitation, soft iron, can be used. In an exemplary embodiment, the material that can be utilized is Vacofer, pure iron materials, Permenorm, Ultraperm, alloys of Nickel-Iron, Vacoflux, Cobalt-Iron alloys, Vitroperm, amorphous Iron-Cupper-Niobium-Silicon-Boron materials, etc.

In an exemplary embodiment, the material that can be utilized is a material which is relatively easily magnetized and demagnetized, at least with respect to industry mass-production standards of NAFTA and EU nations, etc., with a relatively small hysteresis loss. In an exemplary embodiment the, relative permeability of the material of the bobbin, is about 5,000 to about 600,000, or any value or range of values therebetween in 1 unit increments (e.g., 20,000, 40,000, 150,000, 400,000, 10,000 to about 400,000, etc.

Figure 10:
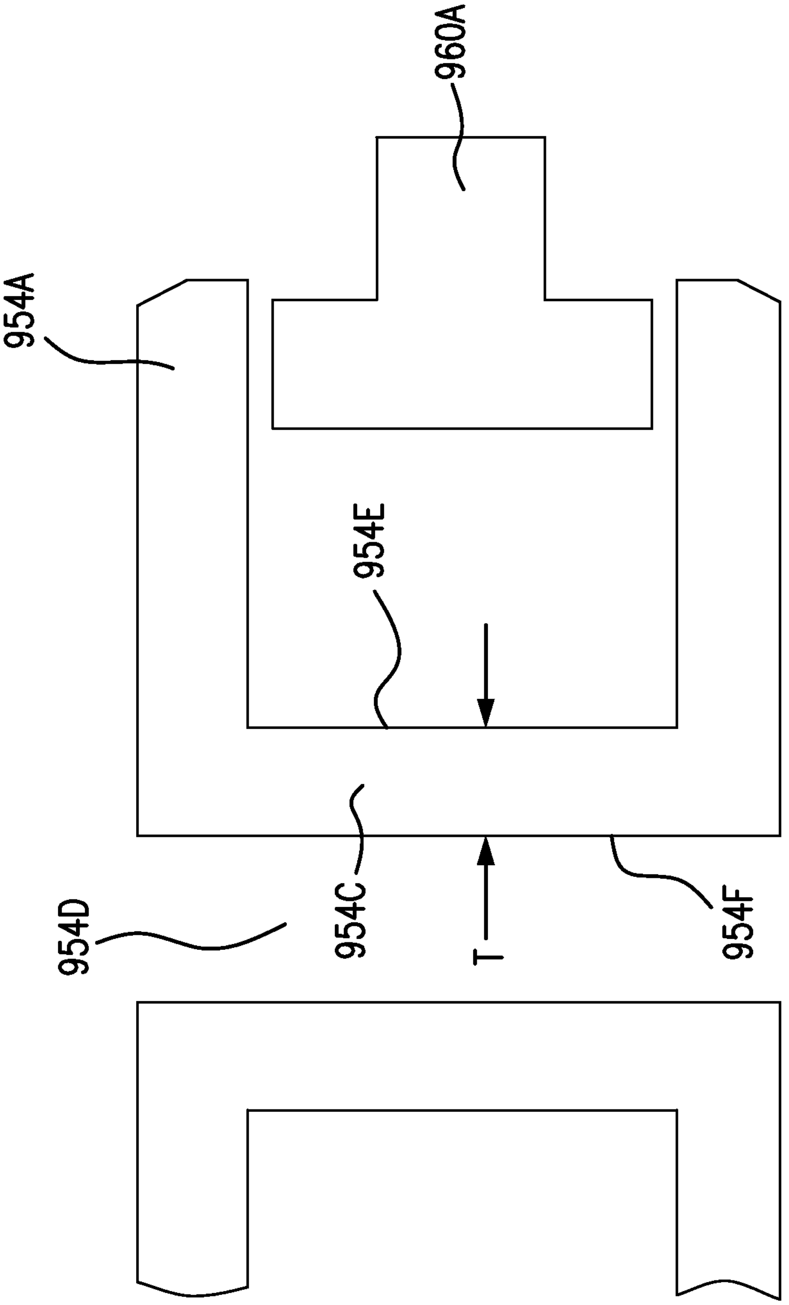
FIG. 10 depicts specific components of the exemplary electromagnetic transducer of FIG. 9.

According to some embodiments, the wall thickness of the core 954C is sized based on a depth of penetration of the dynamic magnetic flux from the surface 954E facing the coils 954B at a corresponding location of the core (e.g., a distance between the outer surface and the inner surface of the core 954C measured on a plane normal to a direction of the dynamic magnetic flux passing through that plane/measured on a plane normal to the longitudinal axis 999 of the electromagnetic transducer 950). In an exemplary embodiment, it is sized based on the depth of penetration of the dynamic magnetic flux. FIG. 10 depicts the bobbin 954A and the yoke 960 of the electromagnetic transducer 950 of FIG. 9 with the other components removed for clarity. Dimension "T" represents the thickness of the core 954C of the bobbin 954A (i.e., as measured on a plane normal to the longitudinal axis 999 of the electromagnetic transducer 950/normal to the direction of the dynamic magnetic flux at that location). This is a distance between the surface 954E and 954F (the surface facing the space 954D). In graphical terms, it is noted that all of the effective dynamic magnetic flux travels through the arrow heads of dimension "T" (where it is noted that FIGS. 9 and 10 are cross-sectional view of a rotationally symmetric electromagnetic vibrator).

It is noted that the embodiments of FIGS. 9 and 10 are depicted as having a bobbin core wall thickness that is uniform. In other embodiments, the bobbin core wall thickness may vary. Accordingly, in some embodiments, the dimension "T" corresponds to a local thickness of the core wall at a given location. In some embodiments, the dimension "T" corresponds to a minimum thickness of the entire core. It is noted that reference to the locations of the dimension "T" relative to the bobbin core correspond to locations of the bobbin core where dynamic magnetic flux flows therethrough.

In an exemplary embodiment, the value of T is an amount that is about equal to 10 times the depth of penetration of the dynamic magnetic flux (effective or otherwise) relative to the outer surface 954E of the core 954C (i.e. the surface facing the coils). In this regard, the depth of penetration is the depth where the magnetic flux density has decreased to 37% of the value at/infinitesimally just beneath, the outer surface 954E. In an exemplary embodiment, the value of dimension "T" is about five times, about three times, about two times or about equal to the depth of penetration of the dynamic magnetic flux relative to the outer surface 954A. In an exemplary embodiment, the value of T is an amount equal to or less than about 10, 9, 8, 7, 6, 5, 4, 3, 2, 1, or about 0.5 times the depth of penetration of the dynamic magnetic flux, or any value therebetween in 0.1 increments (e.g. 9.5, 4.7, etc.). In an exemplary embodiment, the value of T is an amount within the range of about 10 to about 0.1 mm or within any range within the range of about 10 to about 0.1 mm in 0.1 mm increments (e.g., 8.9 to 3.3 mm, 7.9 to 0.1 mm, etc.).

In view of the above, in an exemplary embodiment, the depth of penetration of the dynamic magnetic flux in an exemplary electromagnetic transducer that is utilized as, for example, an active transcutaneous bone conduction device, a passive transcutaneous bone conduction device and/or a percutaneous bone conduction device, is about 0.1 mm to about 0.2 mm for vibrations in the audible spectrum. In some embodiments, the depth of penetration of the flux is about 1, 0.9, 0.8, 0.7, 0.6, 0.5, 0.4, 0.3, 0.2 or about 0.1 mm or any value or range of values therebetween in 0.01 mm increments (e.g., about 0.13 mm, 0.22 to about 0.07 mm, etc.). For the sake of completeness, and without being bound by theory, it is noted that the aforementioned values, in an exemplary embodiment, can be used in an electromagnetic transducer where the maximum diameter of the bobbin (e.g. the length of the "arms") is about 4, mm, 5, mm, 6 mm, 7 mm, 8 mm, 9 mm, 10 mm, 11 mm, 12 mm or about 13 mm in length and/or a length of any value or range of values therebetween in about 0.1 mm increments (e.g., about 7.8 mm, 5.8 mm, 6.7 mm to about 11.2 mm, etc.). It is also noted that the aforementioned values, in an exemplary embodiment, can be used in an electromagnetic transducer where the coupling mass (discussed further below) is about 1 or 2 grams, and the seismic mass (also discussed further below) is about 5 or 6 grams. In an exemplary embodiment, the coupling mass is about 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4 or about 2.5 grams and/or any value or range of values therebetween in 0.01 increments (e.g., 1.13 grams, 1.04 grams to 1.33 grams, etc.). In an exemplary embodiment, the seismic mass is about 4.5, 4.6, 4.7, 4.8, 4.9, 5.0, 5.1, 5.2, 5.3, 5.4, 1.5, 5.6, 5.7, 5.8, 5.9, 6.0, 6.1, 6.2, 6.3, 6.4, 6.5, 6.6, 6.7, 6.8, 6.9, 7.0, 7.5, 8.0, 8.5, 9.0, 9.5, 10.0, 10.5, 11.0, 11.5, 12.0, 12.5, 13.0, 13.5, 14.0, 14.5 or about 15.0 grams and/or any value or range of values therebetween in 0.01 increments (e.g., 6.11 grams, 5.94 grams to 6.58 grams, 7.66 grams to 12.15 grams, etc.). It is noted that in alternate embodiments, any one or more of the above recited values may be different, providing that the teachings detailed herein and/or variations thereof can be practiced.

With regard to the "connection mass" and the "seismic mass," the former refers to the mass of the vibrating electromagnetic transducer-coupling assembly that does not move during energizement of the coil, and the latter refers to the mass of the vibrating electromagnetic transducer-coupling assembly that does move during energizement of the coil. For example, with respect to the embodiment of FIG. 5, which is used with a percutaneous bone conduction device, the connection mass corresponds to the bobbin assembly 554 and seismic mass corresponds to the counterweight assembly 555. More particularly, the connection mass includes the bobbin assembly 554, the spacers 522 and 524 and the coupling assembly 540, which connects to a percutaneous abutment (not included in the connection mass). The seismic mass includes springs 556 and 557, permanent magnets 558A and 558B, yokes 560A, 560B and 560C, spacers 562, and counterweight mass 570.

It is noted that in some embodiments, at least a portion of the springs 556 and 557 do not move when the coil is energized because, for example, a portion of the spring is clamped to the bobbin extension 554E. In this regard the connection mass can include those portions of the springs that do not move/that are clamped; those portions not being included in the seismic mass (but the remaining portions of the springs included in the seismic mass).

Along these lines, some embodiments include transducers that have a coupling mass that is less than that which would exist if there was no space in the bobbin (i.e. if the bobbin was solid). By way of example and not by way of limitation, the difference in mass might be about 0.02, 0.04, 0.06, 0.08, 0.1 0.12, 0.14, 0.16, 0.18, 0.2, 0.22, 0.24, 0.26, 0.28, 0.3, 0.32, 0.34, 0.36, 0.38 or about 0.4 grams or any value or range of values between any of the recited values in 0.005 gram increments (e.g., 0.085 grams, 0.080 grams to 0.115 grams, etc.). It is noted that in alternate embodiments, any one or more of the above recited values may be different, providing that the teachings detailed herein and/or variations thereof can be practiced.

Turning now to another utilitarian feature of some embodiments, in an exemplary embodiment, one or more or all of the aforementioned features (e.g. the reduced connection mass) can have utility in that utilitarian resonant frequencies of a vibrating electromagnetic transducer-coupling assembly can be achieved as compared to such an assembly not having one or more of the aforementioned features. According to an exemplary embodiment, with reference to the embodiment of FIG. 5 (a percutaneous bone conduction device), the vibrating electromagnetic transducer-coupling assembly 580 corresponds to a two degree-of-freedom spring mass system with two resonances. (It is noted that the features now detailed with respect to the embodiment of FIG. 5 can also be applicable to the embodiments of FIGS. 3 and 4 and/or other transducer arrangements—for that matter it is again noted that any teachings disclosed herein and/or variations thereof can be utilized with any of the embodiments detailed herein and/or variations thereof unless otherwise specified). A first resonant frequency (the main resonant frequency) is at about 750 Hz, and is a result of the seismic mass and the stiffness of the springs 556 and 557. A second resonance frequency exists at about an order of magnitude or more higher than the first resonant frequency. For example, the second resonant frequency is a value between about 11,000 to 13,000 Hz. The second resonance is a result of the rigidity of the connection of the coupling assembly 540 to the mating implant (i.e., the abutment) and the connection mass. Some embodiments have utility in that a lower connection mass increases the second resonant frequency. In this regard, the second resonance is relatively high as compared to assemblies having higher connection mass because the efficiency of force transfer from and/or to the transducer from and/or to the mating implant drops off after this resonant frequency.

In an exemplary embodiment, the reduced connection mass can have utility in that it can enable the use of additional components and/or alternative components that would otherwise increase the mass. In this regard, by way of example and not by way of limitation, structurally stronger components which would otherwise increase the weight of the connection mass can be added while maintaining a given resonant frequency. For example, a reduction of a gram as a result of, for example, the hole through the bobbin could enable the addition of a gram of material elsewhere without affecting the resonant frequency of the device.

Accordingly, in an exemplary embodiment, there is a vibrating electromagnetic actuator-coupling assembly, such as that according to the embodiment of FIG. 5, used in a percutaneous bone conduction device, that has a second resonant frequency at about 12.5 kHz. In an exemplary embodiment, there is a vibrating electromagnetic actuator-coupling assembly, again such as that according to the embodiment of FIG. 5, also used in a percutaneous bone conduction device, that has a second resonant frequency at about 9.0, 9.1, 9.2, 9.3, 9.4, 9.5, 9.6, 9.7, 9.8, 9.9, 10.0, 10.1, 10.2, 10.3, 10.4, 01.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4 or about 13.5 kHz or more or a second resonant frequency at about a value or range of values between any of the aforementioned values in 0.01 kHz increments (e.g., 12.7 kHz, 11.53 kHz to 12.97 kHz, etc.). Further along these lines, in an exemplary embodiment, there is a vibrating electromagnetic actuator coupling assembly, also such as that according to the embodiment of FIG. 5, that is used in a percutaneous bone conduction device that has a second resonant frequency that is about 2 kHz greater than that which would be the case if the components were identical except that the bobbin was solid. In an exemplary embodiment, there is a vibrating electromagnetic actuator coupling assembly, also such as that according to the embodiment of FIG. 5 that is used in a percutaneous bone conduction device that has a second resonant frequency that is about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, or 3.5, kHz greater, or any value or range of values therebetween in 0.01 kHz increments (e.g., 2.25 kHz, 1.75 kHz to 2.33 kHz, etc.) than that which would be the case if the components were identical except that the bobbin was solid.

Figure 11:
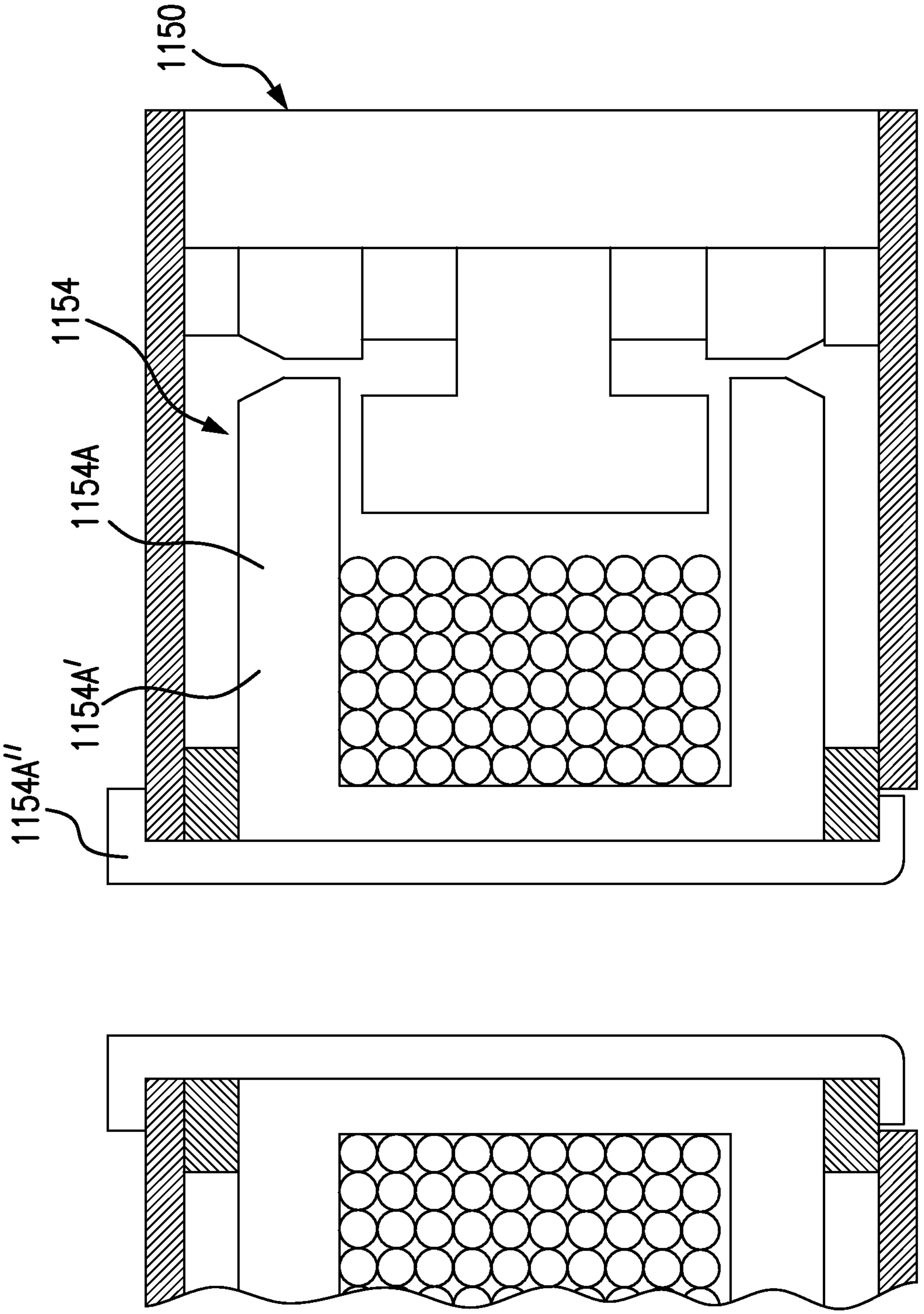
FIG. 11 depicts an exemplary electromagnetic transducer according to an alternate embodiment.

Referring now to FIG. 11, a portion of an electromagnetic transducer 1150 is depicted. The electromagnetic transducer 1150 is identical to electromagnetic transducer 950 detailed above, with the exception that the bobbin core, or at least the magnetically conductive portions thereof, is/are not monolithic, and the hole through the bottom spring has a larger diameter. In particular, the bobbin assembly 1154 includes a main bobbin body 1154A' and a pipe rivet 1154A" extending therethrough, collectively making up a bobbin 1154A. As can be seen, the rivet 1154A" includes a head (upper part) and a flared portion (lower part) that secures the rivet 1154A" to the main bobbin body 1154A' in general, and within the space passing therethrough in particular. In this regard, these components correspond to the traditional components of a pipe rivet. In an exemplary embodiment, the rivet 1154A" is slip-fit or interference-fit into the space passing through the main bobbin body 1154A', although other types of fit, such as a clearance-fit, can be utilized. Any type of fit that will enable the teachings detailed herein and/or the variations thereof to be practiced can be utilized in at least some embodiments. In an exemplary embodiment, the rivet is made of the same or similar material, at least from a magnetic permeability sense, as that of the main bobbin body 1154A'. In an exemplary embodiment, the rivet 1154A" is made of soft iron or another magnetically permeable material. Some variations of the embodiment of FIG. 11 will be described in greater detail below, but first, some exemplary physical phenomena pertaining to the bobbin 1154A will be described.

In some exemplary embodiments, one exemplary physical phenomena can be, without being bound by theory, related to the additional two additional surfaces (the inner and outer surfaces of the rivet 1154") to the bobbin 1154A relative to the bobbin 954A of the embodiment of FIG. 9. This can enable reduced resistance for at least the dynamic magnetic flux passing through the core of the bobbin, if not both the dynamic and static magnetic fluxes (to the extent that there is any static magnetic flux passing therethrough—the depiction of FIG. 9 depict ideal flux blow). Again without being bound by theory, in some exemplary embodiments, the efficiency of the transducer of FIG. 11 can be improved relative to that of the embodiment of FIG. 9, all other things being equal, at least with respect to frequencies between 0 Hz and 20,000 Hz (e.g. the audio frequency range).

Without being bound by theory, in some exemplary embodiments, the additional surfaces provided by the addition of the rivet 1154A" can result in a similar and/or the same phenomena as that afforded by laminations utilized in AC transformers. In this regard, the additional surfaces enable more dynamic flux to pass through the bobbin core. Corollary to this is that the resistance to the flux traveling through the core is reduced.

Continuing without being bound by theory, in some exemplary embodiments, the major source of loss in an electromagnetic transducer (such as, for example a variable reluctance actuator according to any of the above embodiments and/or variations thereof) can be the presence of eddy currents in the bobbin core. In some exemplary embodiments, these eddy currents can dissipate power in the form of heat; power which otherwise could be used to generate vibrational forces and/or to generate an electric output signal. The presence of the additional surfaces afforded by the rivet (as compared to the embodiment of FIG. 9), where the surfaces run substantially parallel (including parallel) to the magnetic field direction, in at least some embodiments can, assists in reducing losses due to eddy currents. In some embodiments, this does not interfere or at least does not substantially interfere with the magnetic flux path(s), but does reduce the eddy current lost by only allowing eddy currents to exist in relatively more narrow layers of material (more narrow in the sense that the wall thickness of the rivet and the wall thickness of the bobbin body core of the embodiment of FIG. 11 are each individually less than the total wall thickness of the bobbin core of the embodiment of FIG. 9). In this regard, without being bound by theory, in some exemplary embodiments, if eddy currents travel in a direction normal to the direction of the magnetic flux, and if a general tendency of the eddy currents to not extend through a surface of a magnetically permeable material (i.e., they are retained within the boundaries of the walls of the rivet and the walls of the bobbin body core), the magnitude of the individual eddy currents can be reduced as compared to those that exist in the embodiment of FIG. 9. Further, without being bound by theory, in some exemplary embodiments, the soft magnetic material can generally have a relatively high electric conductivity, which can correspond to a low resistivity. Therefore, by adding boundaries/layers with low conductivity (air or electric insulators) the resistance for the voltage induced by the magnetic field is increased, thus the eddy currents are reduced. An exemplary embodiment includes an apparatus configured to apply this phenomenon via the addition of the boundaries. It is noted that in an exemplary embodiment, there are air gaps between the boundaries (where air gaps correspond in principle to the air gaps detailed above, which means that the air gaps need not consist of air (they can be filled with a material that achieves the principles of an air gap).)

More particularly, in some exemplary embodiments, the surfaces of the rivets and the interior of the core of the main bobbin body can, without being bound by theory, provide isolating surfaces with respect to currents traveling in a direction normal to the longitudinal axis of the bobbin. Because these surfaces run parallel to the longitudinal axis of the bobbin, they do not provide isolating surfaces with respect to currents traveling in a direction parallel to the longitudinal axis of the bobbin.

Figure 12A:
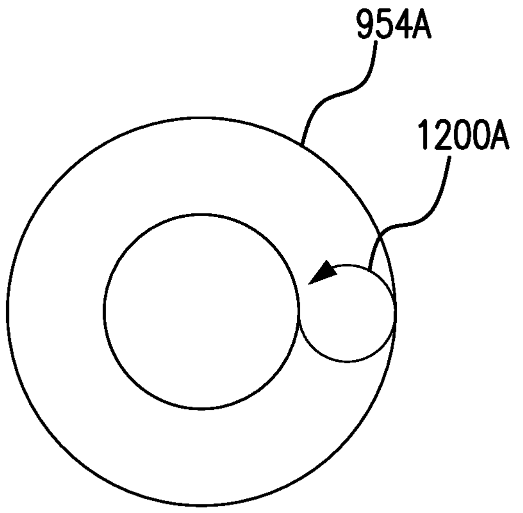
FIGS. 12A-C conceptually depict eddy currents in various electromagnetic transducers according to various embodiments detailed herein and/or variations thereof.
Figure 12B:
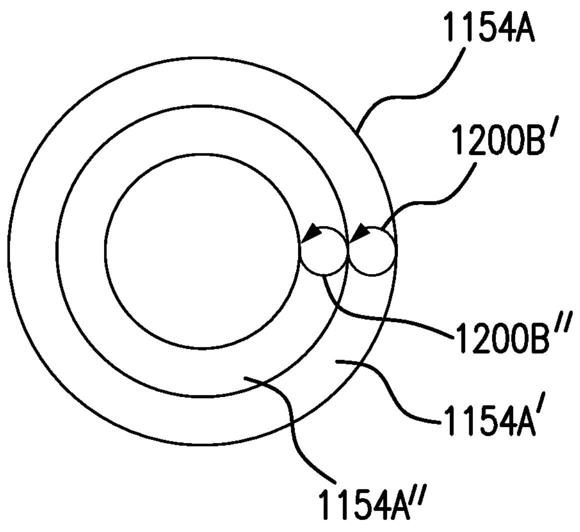

Further along these lines, FIGS. 12A and 12B conceptually depict magnitudes of eddy currents in a bobbin according to the embodiment of FIG. 9 and a bobbin according to the embodiment of FIG. 11 respectively. In particular, FIGS. 12A and 12B depict cross-sections through the center of the bobbins of the embodiments of FIGS. 9 and 11 respectively, the cross-section taken on a plane normal to the direction of the dynamic magnetic flux. As depicted in FIG. 12A and FIG. 12B, eddy current 1200A of bobbin 954A has a magnitude that is larger than either of the eddy currents 1200B' and 1200B" of bobbin 1154A, where the magnitude of the dynamic flux flowing through the respective cores is about equal in both figures.

Without being bound by theory, in some embodiments the resistance to eddy currents can be inversely proportional to cross-sectional area (the cross-section being taken on a plane normal to the direction of the magnetic flux). Accordingly, by reducing the cross-sectional area of any given monolithic component as compared to the monolithic component of the embodiment of FIG. 9, the resistance to eddy currents can be increased relative to that which would exist to the monolithic component of the embodiment of FIG. 9.

Figure 12C:
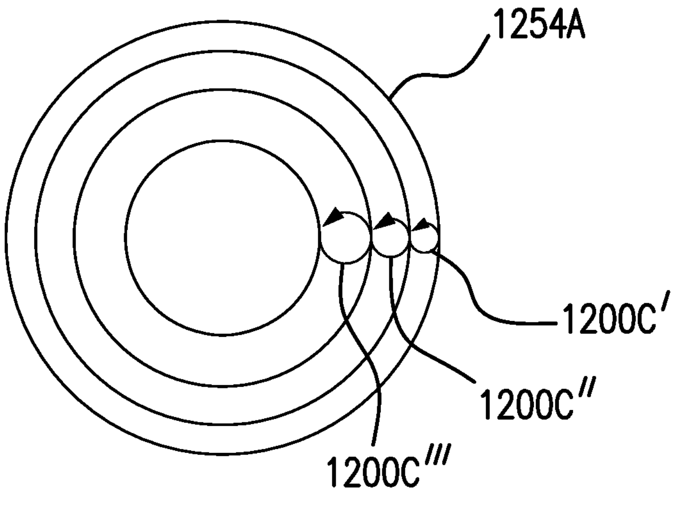

In an exemplary embodiment, without being bound by theory, in some exemplary embodiments, the rivet and/or the bobbin body (at least the core wall thickness of the bobbin body) can be sized and dimensioned such that the eddy current power loss (which, in an exemplary embodiment, is proportional to the square of the current) in the individual components (the rivet and the bobbin body) are sufficiently small that the sum of these individual eddy current power losses is less than the total of the eddy current power loss in solid core of the embodiment of FIG. 9. With respect to the embodiments of FIG. 11, it is noted that the respective wall thicknesses of the core of the main bobbin body 1154A' and the rivet 1154A" are equal. However, in an alternate embodiment, the thicknesses may be different; either the wall of the main bobbin body or the wall of the rivet may be thicker than the other of the main bobbin body or the rivet. Moreover, while the embodiments of FIG. 11 is depicted as having only one rivet, in an alternate embodiment, two or more rivets may be interposed within the space within the main bobbin body, one of the rivets surrounding the other rivet. In this regard, FIG. 12C depicts a core of such an embodiment of an exemplary bobbin 1254A. FIG. 12C also depicts eddy currents within the core of the main bobbin body, and the two rivets (eddy currents 1200C', 1200C" and 1200C'"). As can be seen, the wall thickness of the core of the main bobbin body is thinner than the wall thickness of the outermost rivet, which in turn is thinner than the wall thickness of the inner rivet. Accordingly, the magnitude of the respective eddy currents is different (magnitude growing larger with position inboard of the bobbin.

It is further noted that while all the embodiments depicted in the FIGS. depict a rivet that is hollow, in an alternate embodiment, the rivet, or the innermost rivet the case of a plurality of rivets, can be solid. Further, while the embodiments detailed herein have been described in terms of the utilization of rivets, other embodiments can utilize other mechanical components, such as by way of example and not by way of limitation, interference-fitted tubes, hollow threaded bolts, bushings, laminates, etc. Accordingly, it is noted that while the teachings detailed herein and/or variations thereof generally focus on rivets, these teachings are equally applicable to other mechanical components. Indeed, in an exemplary embodiment, the teachings detailed herein and/or variations thereof are applicable to any structure or structural assembly that has a laminated form. Along these lines, it is noted that without being bound by theory, because in some exemplary embodiments, the isolating surfaces (i.e., the surfaces of the rivet and the surfaces of the core of the main bobbin body, proximate the coils of the bobbin assembly) can enable the physical phenomenon detailed herein to be achieved, some embodiments can be practiced utilizing any structure that will result in establishment of the isolating surfaces.

Additionally, consistent with the description above that the features of the embodiment of FIG. 11 corresponds to a variation of the embodiment of FIG. 9, and that the features of the embodiment of FIG. 9 can correspond to variations of any of the other transducers herein and/or variations thereof, it is noted that while the rivet 1154A" is shown as being truncated at a location proximate the bottom spring, in an alternate embodiment, the rivet can extend past the bottom spring. In particular, exemplary rivets can be implemented into the electromagnetic transducer of the embodiment of FIG. 5 and/or variations thereof, which includes bobbin extension 554E. In this regard, in an exemplary embodiment, the rivet extends downward past the bottom spring (e.g. 556 with respect to the embodiment of FIG. 5), and can be flared outward at a location proximate to the end of the bobbin extension 554E, or at another location. In an exemplary embodiment, the sleeve 544 can be fit into the inside of the rivet. That is, in an exemplary embodiment, instead of sleeve 544 interfacing directly with the bobbin extension 554E, sleeve 544 interfaces directly with the inside of the rivet.

Also, embodiments can utilize rivets of different geometries. Any mechanical apparatus of any dimension that can enable the teachings detailed herein and/or variations thereof relating to the eddy currents to be practiced can be utilized in at least some embodiments.

In some exemplary embodiments, the outer and/or inner surfaces of one or more of the rivets and/or bobbin body are coated with an electrically isolating material. In some exemplary embodiments, the electrically isolating material is Suralac 1000, an organic synthetic resin (ASTM A976-03 class C-3), Suralac 3000, an organic synthetic resin with inorganic fillers (ASTM A976-03 class C-6), Suralac 5000, an organic resin with phosphates and sulphates and/or Suralac 7000, an inorganic phosphate based coating with inorganic fillers and some organic resin. (ASTM A976-03 class C-5). In an exemplary embodiment, the coating may be only an organic mixture (C3 insulation type) or an organic/inorganic mixture of complex resins and chromate, phosphate and oxides (C5 and C6 insulation type).

Without being bound by theory, in some exemplary embodiments, the electrically isolating coatings can further contain the eddy currents within the individual walls of the rivet and the bobbin body core (i.e., it prevents the eddy currents from extending from the bobbin body core to the rivet and/or vice versa). It is noted, however, that in some embodiments, this isolating coating is not utilized; the surface geometries by themselves being sufficient to reduce losses in a utilitarian manner.

Figure 13:
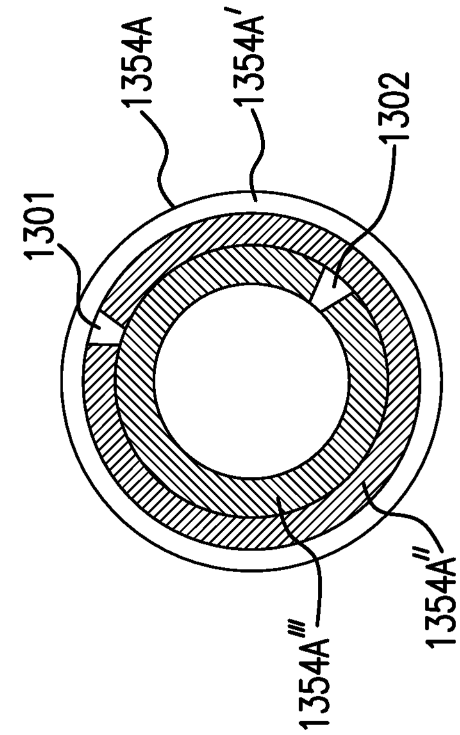
FIG. 13 depicts a cross-sectional view of an exemplary electromagnetic transducer according to another embodiment.

FIG. 13 depicts cross-section of the bobbin core of an alternate embodiment of a bobbin 1354A that utilizes rivets (or other structure as detailed herein and/or variations thereof). As can be seen, both of the rivets 1354A" and 1354A''' inside the core of the main bobbin body 1354A' includes slits (1301 and 1302, respectively). In this regard, the elongated portions of the rivets comprise slit cylinders, where the slit extends along the longitudinal direction of the rivet. In an exemplary embodiment, the slits are generally linear, while in other embodiments, the slits can spiral about at least a portion of the rivet circumference. In an exemplary embodiment, split bushings are utilized to implements the features associated with FIG. 13.

In an exemplary embodiment of the bobbin of FIG. 13, the slit rivets provide an isolation surface in the circumferential direction of the bobbin core (as opposed to, without being bound by theory, only in the radial direction, as can be the case with the embodiments of FIG. 11). More particularly, without being bound by theory, in some embodiments, the dynamic magnetic flux can produce eddy currents that circumnavigate the core of the bobbin (i.e. travel around the longitudinal axis of the bobbin). Such eddy currents still travel normal to the direction of the dynamic magnetic flux/the longitudinal axis of the bobbin. The surfaces provided by the slits (i.e. the break in continuity of the rivets about the longitudinal axis thereof) form isolating surfaces with respect to the currents traveling about the longitudinal axis of the bobbin. Because these surfaces run parallel to the longitudinal axis of the bobbin, they do not provide isolating surfaces with respect to currents traveling in a direction parallel to the longitudinal axis of the bobbin. In this regard, it is noted that the slits can be such that the surfaces contact each other, a thus the term slit does not mean that there is a space between the surfaces, or at least fully between the surfaces.

In an exemplary embodiment, the slit rivets (or other mechanical component) are sized and dimensioned and otherwise configured such that the rivets, once inserted in the space inside the core of the main bobbin body and or inside another rivet, apply an outward force against the inner surface of the corresponding component. In this regard, the rivets have a configuration such that in their relaxed state, they have an outer diameter that is larger than the inner diameter of the component into which they are to be placed. The slits permit the rivet to more easily contract, and, as a corollary, more easily expand, than that with respect to a rivet without a slit. Accordingly, it can be both easier to insert such rivets, and those rivets can be better retained in place as compared to a rivet without a slit.

Also, while the embodiment of FIG. 13 discloses a single slit for each rivet, in an alternative embodiment, some or all rivets can include two or more slits. Further it is noted that while the embodiment disclosed in FIG. 13 depicts the slit as a space between components of a given rivet, in an alternative embodiment, such as those utilizing two or more slits, the slits can constitute abutment areas of a split rivet (or split bushing, etc.).

While the embodiments detailed above depict rivets having an elongate portion having an outer and inner surface that are generally coaxial with one another and have a generally constant distance from a longitudinal axis thereof (i.e., cylindrical), in some alternative embodiments, this may not be the case. For example, rivets can be conical, bowtie shaped when viewed looking in the frame of reference of FIG. 11 (and the negative of bowtie shaped), etc. In at least some embodiments, such rivets can have utility in that such shapes provide retention in a manner different and/or greater than that obtained by a cylindrical section. For example, conical rivets can be used to “wedge” the rivet into the space in the main bobbin body and/or into the rivet into which it is inserted.

With reference back to FIG. 12C, as noted above, it can be seen that the wall thickness of the core of the main bobbin body is not as great as the wall thickness of the middle rivet which in turn is not as great as the thickness of the interior rivet. Further in this regard, some embodiments have utility where the wall thickness of the core the main bobbin body is relatively very thin. In an exemplary embodiment, this wall thickness may be about 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.20, 0.21, 0.22, 0.23, 0.24, or 0.25 mm or any value or range of values therebetween in about 0.001 mm increments. Additionally, in some embodiments, the wall thicknesses of the rivets, or at least the rivets proximate the main bobbin body, can have corresponding thicknesses. Accordingly, some embodiments include bobbins made up of 2, 3, 4, 5, 6, 7, 8, 9, 10, 11, 12, 13, 14, 15, 16, 17, 18, 19 or 20 or more rivets. In this regard, in some embodiments, especially those that utilize relatively thin rivets, the number of rivets is determined based on structural considerations (e.g. to provide a bobbin having sufficient strength to withstand forces subjected to it during normal use).

In view of the above, it is noted that such exemplary embodiments, having relatively thin rivets, permit, in at least some embodiments, an increase in the number of isolating surfaces present in the resulting bobbin. In this regard, as noted above, there can be utility in increasing the number of isolating surfaces, as these surfaces can, in some embodiments, control the extent of the eddy current as detailed herein and/or variations thereof.

Figure 14:
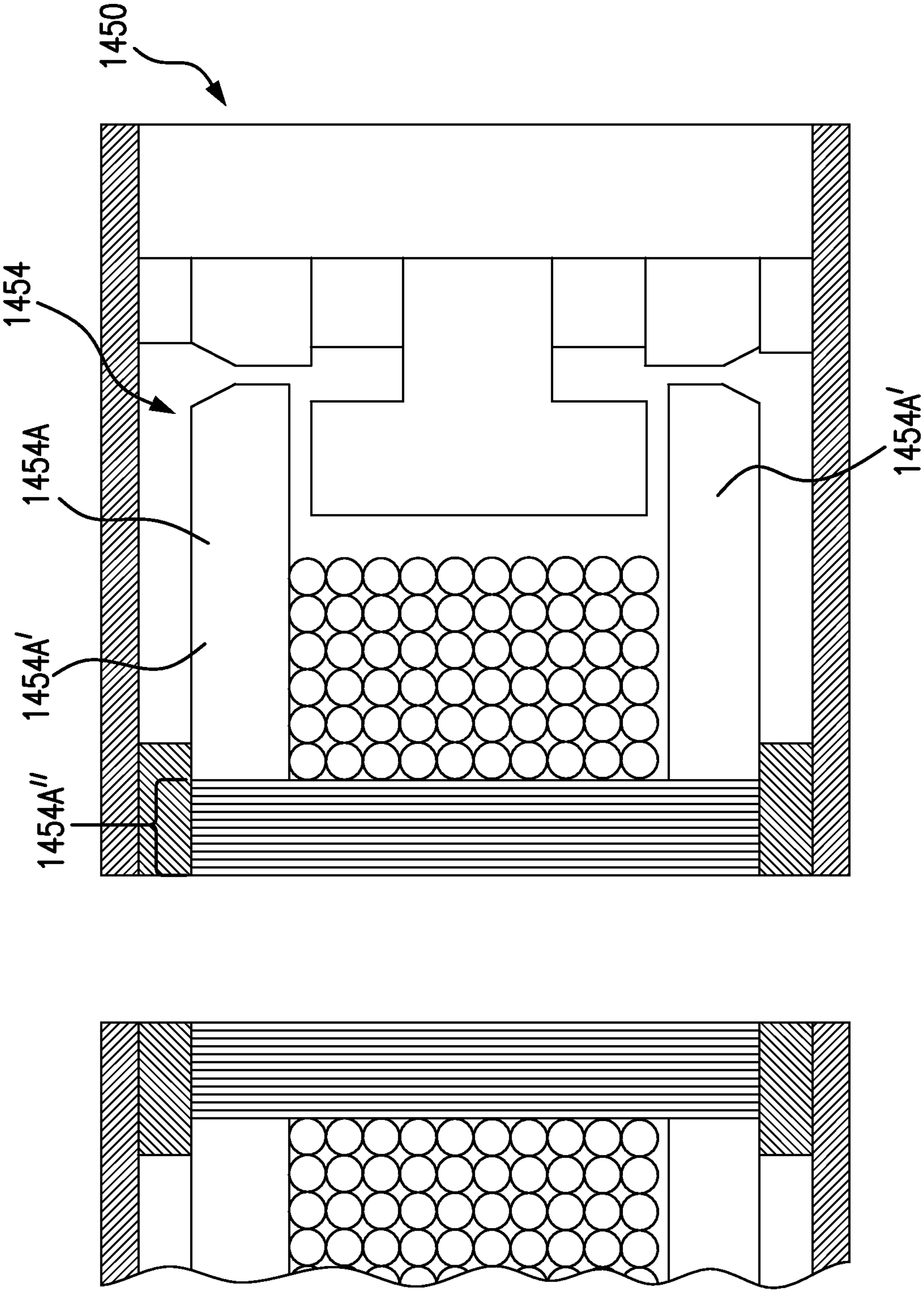
FIG. 14 depicts an exemplary electromagnetic transducer according to an alternate embodiment.

Recognizing that in at least some embodiments, it may be economically unviable to construct a main bobbin body having a core with a wall thickness as detailed above, an alternate embodiment includes a bobbin where the core comprises only rivets (or other mechanical component—in the description below, laminates of a magnetically permeable material, such as soft iron, will be used as an exemplary embodiment), and the “arms” of the bobbin are directly attached thereto. In this regard, FIG. 14 depicts an exemplary embodiment of a transducer 1450 that includes a bobbin assembly 1354 that in turn includes a bobbin 1454A. The bobbin 1454A includes bobbin arms 1454A' and a laminate core 1454A", where the bobbin arms 1454A' constitute disks with holes through the center thereof into which laminate core 1454A" is press-fitted or interference-fitted (or fit in any other way that can enable the teachings herein and/or variations thereof to be practiced). In another alternate embodiment, the bobbin arms 1454A' constitute solid disks where the laminate core 1454A" is secured to the facing surfaces of those disks (e.g., via welding, sintering, etc.). Such an exemplary embodiment can have utility in that the dynamic magnetic flux does not travel across any of the longitudinal surfaces of the laminates (only the lateral surfaces are crossed, and in some embodiments where the lateral ends of the laminates are attached to the arms such that there are no surfaces (e.g., due to melting and subsequent cooling of the local portions of the laminates and arms), these surfaces are not crossed either. In an exemplary embodiment, only some of the laminates stop at the inner surfaces of the arms, and other laminates extend as depicted in FIG. 14. (e.g., the outermost laminates for the first one or two or so mm can stop at the arms, and the inboard laminates can extend all the way through a hole in the arms). In an exemplary embodiment, laminate core 1454A" comprises a number of laminates having wall thicknesses of about 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.20, 0.21, 0.22, 0.23, 0.24, or 0.25 mm or any value or range of values therebetween in about 0.001 mm increments. In an exemplary embodiment, the number of laminates is 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 or more.

Figure 15:
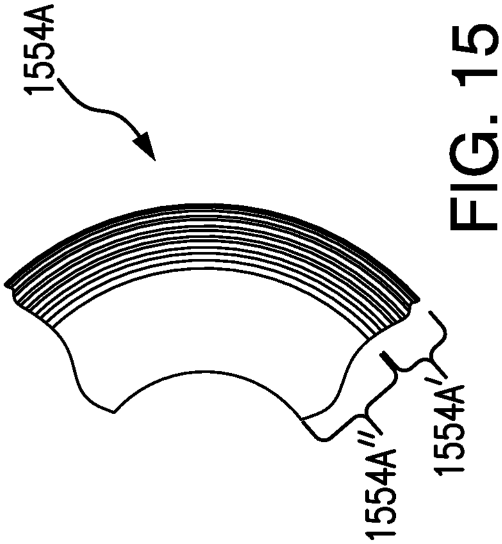
FIG. 15 depicts a cross-sectional view of an exemplary electromagnetic transducer according to another embodiment.

In an exemplary embodiment, the individual laminates are press-fitted or interference-fitted into one another (e.g., by respectively heating a female laminate and placing a relatively cooler male laminate inside the female laminate, etc.). In an alternate embodiment, they are rolled one over the other one at a time. In an exemplary embodiment, the number of laminates that are present correlate to the amount that can achieve utilitarian value with respect to the structural integrity of the bobbin. It is noted that while the embodiment depicted in FIG. 14 depicts the laminates as having wall thicknesses that are the same, in an alternative embodiment, the laminates have wall thicknesses that are different (conceptually, along the lines of the embodiment of FIG. 12C). In this regard, without being bound by theory, in some exemplary embodiments, there can be utilitarian value in having relatively thinner laminates proximate the surface of the bobbin proximate the coils, as compared to the laminates that are located inboard (i.e., away from the coils) of the bobbin. (That said, in an alternate embodiment, this is not the case.) Accordingly, an exemplary embodiment includes an interior laminate having a wall thickness that is substantially greater than any or all of the other laminate combined. It is further noted that in an alternative embodiment, all the laminates may not necessarily be of a magnetically permeable material, such as soft iron. In an exemplary embodiment, with reference to FIG. 15, there is a core of a bobbin 1554A that is a composite bobbin where, for example, one or more of the inner laminates is made of a structurally strong and/or generally light weight (with additional material added to counterbalance the less strength) but magnetically impermeable (or at least relatively less magnetically permeable) material, and the outer laminates are made of a magnetically permeable material (such as soft iron). FIG. 15 depicts a portion of a cross-section of the core of a bobbin 1554A according to such an exemplary embodiment (as with the other cross-sections detailed herein, the cross-section taken on a plane lying normal to the direction of flow of the dynamic magnetic flux). As can be seen, the core includes a magnetically permeable laminate core section 1554A' made up of a plurality of laminates (2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 or more), although in an alternate embodiment it can be made up of only one laminate, and a section 1554A" made up of a different material, where section 1554A" is sized and dimensioned and made up of a material that provides sufficient mechanical strength to the bobbin 1554A. In an exemplary embodiment, the section 1554A' provides relatively minimal mechanical strength to the bobbin, at least as compared to that provided by section 1554A". In an exemplary embodiment, the use of different materials provides a relatively light weight bobbin that has at least some of the physical phenomena associated with the use of rivets/laminates detailed herein and/or variations thereof.

Without being bound by theory, in some exemplary embodiments, the use of the rivets (including laminations or other alternate structure), or, more particularly, the use of the isolating surfaces afforded by those rivets, can increase the penetration depth of the dynamic magnetic flux with respect to the surface of the core of the bobbin proximate the coils. This can have the effect of permitting an increased dynamic magnetic flux through the bobbin core as compared to a bobbin having the same dimensions but not including the rivets/isolating surfaces. Corollary to this is that this can have the effect of reducing resistance to the dynamic magnetic flux through the core of the bobbin as compared to a bobbin having the same dimensions but not including the rivets/isolating surfaces.

Continuing without being bound by theory, in some exemplary embodiments, breaking the eddy currents up into currents having a smaller magnitude and/or in a more numerous in population, additional dynamic magnetic flux can be generated as a result of those additional eddy currents. Along these lines, an increase in the number of isolating surfaces can, in some exemplary embodiments, without being bound by theory, increase the amount of dynamic magnetic flux that can pass through the core of the bobbin and/or reduce resistance to the passage of that dynamic magnetic flux therethrough.

According to some exemplary embodiments, the passageways discussed herein and/or variations thereof can have utility with respect to enabling the conversion of a percutaneous bone conduction device to a transcutaneous bone conduction device (active and/or passive) and visa-versa, and some exemplary embodiments entailing methods of such conversions will now be detailed. More particularly, the following presents some exemplary methods directed towards a methods of converting a bone fixture system configured for use with a percutaneous bone conduction device to a bone fixture system configured for use with a transcutaneous bone conduction device (active and/or passive).

In an exemplary embodiment, a surgeon or other trained professional including and/or not including certified medical doctors (hereinafter collectively generally referred to as a physicians) is presented with a recipient that has been fitted with a percutaneous bone conduction device, where the bone fixture system utilizes a bone fixture to which an abutment is connected via an abutment screw (e.g., the embodiment of FIG. 6). More specifically, at an initial action, the physician obtains access to a bone fixture of a percutaneous bone conduction device implanted in a skull, wherein an abutment is connected to the bone fixture that extends through the skin of the recipient. Next (although intervening actions may be taken—any method detailed herein can include intervening actions unless otherwise specified—terms such as “next” or “after” are utilized with respect to general temporal aspects of order and not immediacy) the physician removes the abutment from the bone fixture. In the scenario where the abutment is attached to the bone fixture via an abutment screw that extends through the abutment and is screwed into the bone fixture, this step further includes unscrewing the abutment screw from the bone fixture to remove the abutment from the bone fixture. Next, a vibratory apparatus, such as the vibratory portion 355 of the embodiment of FIG. 3, in the case of a passive transcutaneous bone conduction device, is positioned beneath the skin of the recipient. In an exemplary embodiment, the vibratory apparatus is slip-fitted or interference-fitted onto the bone fixture, and a screw is screwed into the bone fixture to secure the vibratory apparatus to the bone fixture, thereby at least one of maintaining or establishing the rigid attachment of the vibratory apparatus to the bone fixture.

Prior to one or more or all of the aforementioned actions and/or after one or more or all of the aforementioned actions and/or between two of the aforementioned actions, one or more or all of the following method actions can be executed. Alternatively, or in addition to this, a separate method including the following method actions can be practiced.

First, the electromagnetic transducer of the removable component of the percutaneous bone conduction device previously attached to the abutment (or another abutment) is removed from a coupling assembly, optionally along with any other pertinent components and then placed in an external device for use in a passive transcutaneous bone conduction device.

In this regard, an embodiment of the removable component of the percutaneous bone conduction device is such that there is a passageway through the bobbin and the other pertinent components of the electromagnetic transducer. In some embodiments, a through bolt or the like or other fastening system extends through the passageway to maintain the coupling assembly in fixed relationship to the electromagnetic transducer of the percutaneous bone conduction device. Is noted that in an exemplary embodiment, the through bolt or the like or other fastening system that extends through the passageway is removed or otherwise undone such that the coupling assembly and other components can be removed from fixed relationship with the electromagnetic transducer.

Still further by way of example, in some embodiments of this conversion method, the communication lines between the electromagnetic transducer (e.g. electrical leads) and other components of the removable component the percutaneous bone conduction device are disconnected. Is noted, however, that in an exemplary embodiment, these connections and/or other connections, such as those with associated components, such as for example the sound processor and the like, are also removed from the removable component of the percutaneous bone conduction device.

Still further, the exemplary method includes, at least with respect to conversion for use with a passive transcutaneous bone conduction device, establishment of a pressure plate apparatus that, when coupled to the removed electromagnetic vibrator, results in an external device that corresponds to an external device of a passive transcutaneous bone conduction device (e.g., according to the alternate embodiment of the embodiment of FIG. 8C, as detailed above).

Specifically, the pressure plate of the established pressure plate apparatus functionally corresponds to plate 346 detailed above with respect to FIG. 3, and the removed electromagnetic transducer functionally corresponds to vibrating electromagnetic actuator 342 detailed above with respect to FIG. 3. Placing the electromagnetic transducer in fixed relationship to the pressure plate can be accomplished, by way of example only and not by way of limitation, by inserting a fastening system, such as a bolt or the like, through the passageway of the electromagnetic transducer to or from the pressure plate. A spacer and/or other supporting structure can be interposed between the plate and the electromagnetic transducer in some embodiments. If the sound processor was removed from the removable component of the percutaneous bone conduction device, that sound processor can be included in the external device or can be included in the in a separate component. Accordingly, in an exemplary embodiment, the passageway through the electromagnetic transducer enables the transducer to be attached to a pressure plate of the external device of a passive transcutaneous bone conduction device without utilizing the coupling assembly of the removable component of the percutaneous bone conduction device.

It is noted that in an exemplary embodiment, the fastening system and, if present, other structure, are configured or otherwise arranged such that when assembled, vibrations from electromagnetic transducer removed from the removable component of the percutaneous bone conduction device are transmitted to the pressure plate. In this regard, the fastening system utilizing the passageway permits the electromagnetic transducer of the removable component of the percutaneous bone conduction device to be rigidly linked to the pressure plate apparatus. Thus, the existing electromagnetic transducer, along with, optionally, the existing sound processor (which in some embodiments, has been fitted (tailored through programming) to unique aspects of a given recipient) can be reused in an external device of a passive transcutaneous bone conduction device (and with the case of the sound processor, with relatively minimal, if any additional fitting/reprogramming), for the same recipient.

It is noted that while the embodiments detailed herein have been directed towards utilizing a fastening system that extends all the way through the passageway of the electromagnetic transducer, in other embodiments, a fastening system may only extend part of the way into the passage (e.g. a bottom of the passage may be threaded, wherein the fastening system has mating threads that interface with the threads of the passageway such that a compressive force can be obtained between the pressure plate and the electromagnetic transducer by turning the fastening system (e.g. from the bottom of the pressure plate), etc.). Any device, system, or method that can utilize the passageway of the removed electromagnetic transducer to fix the transducer to a pressure plate of an external device of a passive transcutaneous bone conduction device can be utilized in some embodiments.

In accordance with the variation of the above method, in an alternative embodiment, instead of establishing an external device of a passive transcutaneous bone conduction device, the method includes establishing a vibratory apparatus of an active transcutaneous bone conduction device corresponding to vibratory apparatus 453 of the embodiment of FIG. 4. That is, after removing the electromagnetic transducer from the removable component of the passive transcutaneous bone conduction device, instead of placing it into the external device of the passive transcutaneous bone conduction device, the electromagnetic transducer is placed into a housing of a vibratory apparatus of an implantable component of an active transcutaneous bone conduction device (e.g., such as the housings of FIGS. 8A and 8B). Still further, the passage can be utilized for the fixation system to achieve a coupling analogous to and/or substantially the same as and/or the same as that of the vibrating electromagnetic transducer-coupling assembly according to that of the embodiments of FIGS. 8A and/or 8B. In some examples of some such embodiments, the sound processor removed from the percutaneous bone conduction device can be placed in the external component of the active transcutaneous bone conduction device with, at least in some embodiments, relatively minimal, if any additional fitting/reprogramming.

Of course, in such an alternate method, the action of implanting the vibratory portion is replaced with the action of implanting a vibratory apparatus having the removed electromagnetic transducer.

It is noted that in alternate embodiments, there are methods that include practicing some of the actions just detailed in reverse. For example, instead of utilizing the electromagnetic transducer (and, optionally, other components, such as the sound processor, etc.) of a percutaneous bone conduction device to establish an external device of the passive transcutaneous bone conduction device and/or the vibratory apparatus of an active transcutaneous bone conduction device, the electromagnetic transducer of one the latter devices is removed from the respective device (active or passive transcutaneous bone conduction device) and placed into a percutaneous bone conduction device or the other of the active or passive transcutaneous bone conduction device.

In yet another alternative embodiment, there is an electromagnetic transducer that is configured, such as by way of example, through the use of the passageway therethrough detailed herein and/or variations thereof, for use in two or more of a percutaneous bone conduction device, an active transcutaneous bone conduction device and/or a passive transcutaneous bone conduction device. That is, in an exemplary embodiment, the electromagnetic transducer is a "universal" electromagnetic transducer with respect to bone conduction devices. Accordingly, there is a method that includes manufacturing bone conduction devices, which entails placing a first electromagnetic transducer according to a first design into a percutaneous bone conduction device, an active transcutaneous bone conduction device or a passive transcutaneous bone conduction device, and placing a second electromagnetic transducer and/or a third electromagnetic transducer at least generally according to the first design into at least one or both of the other of the percutaneous bone conduction device, the active transcutaneous bone conduction device or the passive transcutaneous bone conduction device. The first design and the design at least generally according to the first design having a passageway at least partially therethrough as detailed herein and/or variations thereof.

In another exemplary method, there is a method that entails evoking an effective hearing percept utilizing a first electromagnetic transducer according to a first design with a percutaneous bone conduction device, an active transcutaneous bone conduction device or a passive transcutaneous bone conduction device, and evoking a hearing percept utilizing a second and/or a third electromagnetic transducer generally according to the first design with one of both of the other of the percutaneous bone conduction device, the active transcutaneous bone conduction device or the passive transcutaneous bone conduction device. The first design and the design at least generally according to the first design having a passageway at least partially therethrough as detailed herein and/or variations thereof.

It is noted that the methods detailed herein and or variations thereof can be executed utilizing, by way of example, the electromagnetic transducers detailed herein and/or variations thereof.

It is further noted that any method of manufacture described herein constitutes a disclosure of the resulting product, and any description of how a device is made constitutes a disclosure of the corresponding method of manufacture. Also, it is noted that any method detailed herein constitutes a disclosure of a device to practice the method, and any functionality of a device detailed herein constitutes a method of use including that functionality.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A device, comprising:

an electromagnetic transducer in vibrational communication with a fixation component, wherein the electromagnetic transducer is locationally fixed to the fixation component via a mechanical connection extending into the electromagnetic transducer.

2. The device of claim 1, wherein:

the device is configured to be completely implanted beneath skin of a human; and the fixation component is a bone fixture configured to be implanted in a recipient.

3. The device of claim 1 wherein:

the fixation component is a component of a pressure plate of an external component of a passive transcutaneous bone conduction device.

4. The device of claim 1, wherein:

the electromagnetic transducer is part of an implanted vibratory apparatus of an active transcutaneous bone conduction device; and a longitudinal axis of the electromagnetic transducer is aligned with that of the fixation component.

5. The device of claim 1, wherein:

the device includes a shaft and an implanted component including at least one of a bone fixture and an abutment coupled to a bone fixture; and the shaft extends through the electromagnetic transducer and couples with at least one of the bone fixture or the abutment.

6. The device of claim 1, wherein:

the fixation component is a recipient coupling of a removable component of a percutaneous bone conduction device.

7. The device of claim 1, wherein:

the electromagnetic transducer includes a bobbin having a passage therethrough and a coil being wound about the bobbin, wherein the bobbin conducts a dynamic magnetic field away from the coil to interact with magnetic material so located during transduction of the electromagnetic transducer; and the mechanical connection extends into the passage in the bobbin.

8. The device of claim 7, wherein:

the fixation component is configured to fix the electromagnetic transducer to a prosthetic component implanted in a recipient.

9. The device of claim 7, wherein:

the mechanical connection is a threaded fastener device.

10. The device of claim 7, wherein:

the mechanical connection is a bolt.

11. The device of claim 7, wherein:

the fixation component is a snap coupling assembly of a percutaneous bone conduction device, and the device is a percutaneous bone conduction device.

12. The device of claim 7, wherein:

the fixation component is a snap coupling assembly that includes at least two components securely held against one another so that a retention force established by the mechanical connection applied to one of the at least two components is also applied to at least another of the at least two components.

13. The device of claim 12, wherein:

the at least two components include a toothed coupling and a sleeve located partially inside the toothed coupling, the fixation component being attached to the sleeve, the sleeve being a protective sleeve that protects teeth of the toothed coupling.

14. The device of claim 13, wherein:

the device is snap coupled to a percutaneous abutment; and a portion of the sleeve and a portion of the toothed coupling are located inside the percutaneous abutment with respect to a longitudinal axis of the percutaneous abutment.

15. The device of claim 13, wherein:

the device includes a spring attached to the bobbin, the spring permitting a counter-mass of the electromagnetic transducer to move relative to the bobbin when the transducer is energized;

the spring is located on a side of the bobbin on which the sleeve and the tooth coupling are located; and the sleeve and the toothed coupling are completely located on an opposite side of the spring relative to the bobbin.

16. The device of claim 13, wherein:

the device is configured to enable removal and replacement of the sleeve without disassembling the device.

17. The device of claim 13, wherein:

the sleeve is at least interference fitted or at least slip fitted to the rest of the device.

18. The device of claim 13, wherein:

the toothed coupling has a passage extending from one side to the other; and the passage of the toothed coupling is part of a path that leads to the passage in the bobbin.

19. The device of claim 13, wherein:

the device includes a first spring on one side of the bobbin and a second spring on another side of the bobbin opposite the side on which the first spring is located, the springs permitting a counter-mass of the electromagnetic transducer to move relative to the bobbin when the transducer is energized; and the springs are held to the bobbin with a rivet that is flared outward, the rivet extending, relative to the bobbin, past both springs.

20. The device of claim 13, wherein:

the device is configured to enable removal and replacement of the sleeve without disassembling the device beyond removing a housing of the device.

21. The device of claim 7, wherein:

the device includes a toothed coupling and a sleeve located partially inside the toothed coupling, the fixation component being attached to the sleeve, the sleeve being a protective sleeve that protects teeth of the toothed coupling;

the fixation component is a snap coupling assembly established at least in part by the toothed coupling and the sleeve;

the device includes an extension that interfaces with the bobbin and which has a passage therethrough, the passage of the extension being in communication with the passage in the bobbin into which the mechanical connection extends;

the extension supports the combination of the toothed coupling and the sleeve away from the electromagnetic transducer; and the mechanical connection extends from the snap coupling assembly, into the passage of the extension and into the passage in the bobbin to secure the snap coupling assembly to the electromagnetic transducer.

22. The device of claim 7, wherein:

the fixation component includes a rivet that is flared outward at a location proximate to an end of the bobbin.

23. The device of claim 1, wherein:

the electromagnetic transducer includes a bobbin having a passage therein, a coil being wound about the bobbin, wherein the bobbin conducts a dynamic magnetic field outboard of the coil to interact with magnetic material so located during transduction of the electromagnetic transducer; and the mechanical connection extends into the passage in the bobbin.

* * * * *